United States Patent [19]
Coolbaugh et al.

[11] Patent Number: 5,747,598
[45] Date of Patent: *May 5, 1998

[54] EPOXIDIZED SOLID ELASTOMERIC COPOLYMERS

[75] Inventors: Thomas S. Coolbaugh, Yardley, Pa.; Frederick Charles Loveless, Princeton; Demetreos N. Matthews, North Edison, both of N.J.

[73] Assignee: Mobil Oil Corporation, Fairfax, Va.

[*] Notice: The term of this patent shall not extend beyond the expiration date of Pat. No. 5,268,427.

[21] Appl. No.: 734,988

[22] Filed: Oct. 22, 1996

Related U.S. Application Data

[60] Continuation-in-part of Ser. No. 443,743, May 18, 1995, abandoned, which is a division of Ser. No. 361,072, Dec. 21, 1994, Pat. No. 5,457,161, which is a division of Ser. No. 225,681, Apr. 11, 1994, Pat. No. 5,376,722, which is a division of Ser. No. 29,507, Mar. 11, 1993, Pat. No. 5,306,780, which is a division of Ser. No. 952,127, Sep. 28, 1992, Pat. No. 5,268,427, which is a division of Ser. No. 466,233, Jan. 16, 1990, Pat. No. 5,187,236.

[51] Int. Cl.$^6$ ............................................. C08F 297/04
[52] U.S. Cl. ............................................. 525/314
[58] Field of Search .......................... 525/314, 98, 271

[56] References Cited

U.S. PATENT DOCUMENTS

| | | | |
|---|---|---|---|
| 3,448,174 | 6/1969 | Loveless et al. | 525/285 |
| 4,879,349 | 11/1989 | Hoxmeir | 525/332.8 |

OTHER PUBLICATIONS

*Die Angewandte Makromelekulare Chemie* 21 (1972) 17–23 (Nr. 286) "Synthesis and Properties of Ethylene, Isoprene and Ethylene, Isoprene, Styrene Block Polymers" by John Carl Falk and R.J. Schlott.

*Journal of Polymer Science*: Part A-1, vol., 9, 2617–2623 (1971) "Coordination Catalysts for the Selective Hydrogenation of Polymeric Unsaturation",by John Carl Falk, Roy C. Ingersoll Research Center, Borg–Warner Corporation.

*Polymer*, 1982, vol. 23, Sep. pp. 1523–1535, "Hydrogenated Linear Block Copolymers of Butadiene and Isoprene; Effects of Variation of Composition and Sequence Architecture on Properties ", by Y. Mohajer, G.L. Wilkes, I.C. Wang, and J.E. McGrath.

*Primary Examiner*—Mark L. Warzel
*Attorney, Agent, or Firm*—Lori F. Cuomo; Dennis P. Santini

[57] ABSTRACT

An epoxidized linear block copolymer which prior to epoxidation comprises at least one triblock I—B—I, wherein I is a block of a polymerized conjugated diene of at least 5 carbon atoms, such as isoprene, and B is a block of a polymer of a conjugated diene, different from that polymerized to form the I blocks, of at least 4 carbon atoms, such as 1,3-butadiene. The B block may be selectively hydrogenated before or after epoxidation so that they contain substantially no ethylenic unsaturation, while the epoxidation reaction forms epoxy groups from double bonds in the I blocks. Also disclosed is an alternative epoxidized solid linear block copolymer which prior to epoxidation contains at least one triblock wherein the first polymer block is a copolymer of an aryl-substituted olefin, such as styrene, and the conjugated diene used to polymerize the block I, the second or middle block is a polymer of the diene used to polymerize the block B, and the third polymer block is the same as the first polymer block. In this alternative copolymer, the middle block may also be selectively hydrogenated, so that it contains substantially no ethylenic unsaturation while the epoxidation reaction forms epoxy groups from double bonds in the first and third blocks. The disclosure also includes epoxidized solid linear random copolymers and solid star-branched block and random copolymers made from the same monomers as the linear block copolymers, and methods for producing the foregoing epoxidized polymers.

25 Claims, No Drawings

EPOXIDIZED SOLID ELASTOMERIC COPOLYMERS

This application is a continuation-in-part of application Ser. No. 08/443,743, filed May 18, 1995, now abandoned, which is a divisional of application Ser. No. 08/361,072, filed Dec. 21, 1994 and now U.S. Pat. No. 5,457,161, which is a divisional of application Ser. No. 08/225,681, filed Apr. 11, 1994 and now U.S. Pat. No. 5,376,722, which is a divisional of application Ser. No. 08/029,507, filed Mar. 11, 1993 and now U.S. Pat. No. 5,306,780, which is a divisional of Ser. No. 07/952,127, filed Sep. 28, 1992 and now U.S. Pat. No. 5,268,427, which is a divisional of application Ser. No. 07/466,233, filed Jan. 16, 1990 and now U.S. Pat. No. 5,187,236.

BACKGROUND OF THE INVENTION

1. Field of the Invention

This invention is directed to novel epoxidized solid elastomeric block and random copolymers. More particularly, the invention is directed to epoxidized solid elastomeric block copolymers wherein epoxide groups are present preponderantly in the terminal blocks.

The invention is also directed to epoxidized polymers produced by epoxidizing solid random copolymers made up of elastomeric molecules having substantially saturated backbones and random, pendant unsaturation which is converted to epoxide groups.

Cross-linking of the epoxidized polymers of the invention produces cured polymers having unusual properties, e.g., high elongation and excellent aging characteristics.

2. Description of Related Art

Elastomers (or rubbers) of either natural or synthetic origin usually require cross-linking, also referred to as curing or vulcanization for transformation into insoluble, non-deformable high strength elastomeric products. Before vulcanization, rubbers possess inferior properties and low strength which limit their utility.

There are a number of well known methods for achieving the crosslinking of unsaturated elastomers. Such methods include the use of sulfur and accelerators, peroxides, benzoquinone dioxime, certain phenolic resins and similar agents.

The great majority of currently known synthetic elastomers are based on polymers or copolymers of butadiene or isoprene. These polymers, which include cis-polybutadiene, emulsion polybutadiene (EBR), styrene-butadiene copolymer (SBR), butadiene-acrylonitrile copolymer (NBR) and cis-polyisoprene, provide raw materials for the production of a very large volume of rubber goods, such as automotive tires, conveyor belts, adhesives, footwear, sponge and mechanical goods. Because of the high degree of unsaturation inherent in the polymeric backbones, these elastomers are easily and quickly vulcanizable alone or in blends. A secondary consequence of the high degree of backbone unsaturation is the instability of such elastomers in the presence of ozone and oxygen, both of which promote rapid deterioration of these elastomers.

Butyl rubber, which is a copolymer of isobutylene and 2–3% by weight (wt.) of isoprene, represents a class of elastomers far more resistant to oxygen and ozone than those based on butadiene or isoprene. The backbone of butyl rubber is primarily polyisobutylene (which provides a saturated spine) into which there is randomly copolymerized about 2–3% by wt. of isoprene to provide unsaturated sites for vulcanization. Butyl rubber finds limited use because of its relatively poor elastomeric properties, and is used primarily in applications which take advantage of its damping properties, weathering resistance and low gas permeability.

Ethylene-propylene-diene rubber (EPDM) has enjoyed substantial commercial growth as a synthetic rubber since it combines excellent oxidation resistance with good elastomeric properties. This elastomer is prepared by the polymerization of ethylene, propylene and a non-conjugated diene, such as 1,4-hexadiene, dicyclopentadiene or ethylidene norbornene. Diene incorporation is typically 5–10% by weight (wt.). The diene is randomly incorporated into the saturated ethylene-propylene backbone to provide pendant vulcanization sites.

The above prior art elastomers, with either high or low levels of unsaturation, are characterized in that, having random unsaturation, they are randomly crosslinked during vulcanization. The success of vulcanization in incorporating all molecular chains into the final crosslinked network with minimal "loose ends" is termed the degree of network perfection. An imperfect network, wherein crosslinks occur randomly and sometimes not near the end of a molecular chain, produces a vulcanized polymer having poor mechanical and elastomeric properties caused by chain ends which are not a part of the tightly bound network. In order to insure the highest degree of network perfection attainable, randomly unsaturated elastomers must be crosslinked extensively. The large number of crosslinks necessary (25 to 40 per 100,000 molecular weight) dictates that the average distance between crosslinks ($M_c$) must be relatively small in comparison with the dimensions of the whole molecule. Elastomeric properties, such as elongation, depend greatly on $M_c$—the smaller the $M_c$ the worse are the elastomeric properties, e.g., the lower the elongation of the vulcanized polymer.

Various block copolymers having excellent elastomeric properties, especially elongation, have been made in the past. For example, a block copolymer commonly known as KRATON, manufactured by Shell Chemical Company, which has outstanding properties at room temperature, is a thermoplastic elastomer consisting of block segments of polymerized styrene units and polymerized aliphatic diolefin units, such as butadiene or isoprene. The most common structure of KRATON is the linear A—B—A block, such as styrene—butadiene—styrene (S—B—S) or styrene—isoprene-styrene (S—I—S). One of such rubbers is believed to be described by Jones, U.S. Pat. No. 3,431,323. Jones discloses block copolymers containing block segments of polymerized vinyl arene monomer units, e.g., styrene, butadiene monomer units, and vinyl arene units. After the block copolymer is prepared, it may be subjected to hydrogenation to such a degree that the unsaturation of the polybutadiene block is reduced to less than 10% of its original value, while 10–25% of the poly-vinyl arene block segments are hydrogenated. Although the KRATON triblock copolymers have excellent elastomeric properties at room temperature, since they are thermoplastic materials they lose these properties at temperatures of about 80° C. (and higher). In addition, since these polymers are not chemically crosslinked, they are soluble in many organic solvents. These latter two deficiencies place some restrictions on the viable areas of application for these polymers.

Falk, JOURNAL OF POLYMER SCIENCE: PART A-1, Volume 9, 2617–2623 (1971), the entire contents of which are incorporated herein by reference, discloses a method of selectively hydrogenating 1,4-polybutadiene units in the presence of 1,4-polyisoprene units. More particularly, Falk discloses selective hydrogenation of the 1,4-polybutadiene block segment in the block copolymer of 1,4-polybutadiene-1,4-polyisoprene-1,4-polybutadiene and in random copolymers of butadiene and isoprene, with both polymerized monomers having predominately 1,4-microstructure. Selective hydrogenation is conducted in the presence of hydrogen and a catalyst made by the reaction of organoaluminum or lithium compounds with transition metal salts of 2-ethylhexanoic acid.

Falk, DIE ANGEWANDTE CHEMIE 21 (1972) 17-23 (No. 286), the entire contents of which are also incorporated herein by reference, discloses the selective hydrogenation of 1,4-polybutadiene segments in a block copolymer of 1,4-polybutadiene-1,4-polyisoprene-1,4-polybutadiene.

Hoxmeier, Published European Patent Application 88202449.0, filed on Nov. 2, 1988, Publication Number 0 315 280, published on May 10, 1989, corresponding to U.S. Pat. No. 4,879,349, issued Nov. 7, 1989, discloses a method of selectively hydrogenating a polymer made from at least two different conjugated diolefins. One of the two diolefins is more substituted in the 2,3 and/or 4 carbon atoms than the other diolefin and produces tri-or tetra-substituted double bond after polymerization. The selective hydrogenation is conducted under such conditions as to hydrogenate the ethylenic unsaturation incorporated into the polymer from the lesser substituted conjugated diolefin, while leaving unsaturated at least a portion of the tri- or tetra- ethylenic unsaturation incorporated into the polymer by the more substituted conjugated diolefin.

Mohajer et al., *Hydrogenated linear block copolymers of butadiene and isoprene: effects of variation of composition and sequence architecture on properties*, 23 POLYMER 1523-1535 (September 1982) disclose essentially completely hydrogenated butadiene-isoprene-butadiene (HBIB), HIBI and HBI block copolymers in which butadiene has predominantly 1,4-microstructure.

Kuraray K K, Japanese published patent application Number JP-328729, filed on Dec. 12, 1987, published on Jul. 4, 1989, discloses a resin composition comprising 70–99% wt. of a polyolefin (preferably polyethylene or polypropylene) and 1–30% wt. of a copolymer obtained by the hydrogenation of at least 50% of the unsaturated bonds of an isoprene/butadiene copolymer.

U.S. Pat. No. 3,448,174, issued Jun. 3, 1969 to Loveless et al. discloses epoxidized elastomeric copolymers of ethylene, a higher alpha-olefin, e.g., propylene, and a copolymerizable diene, e.g., dicyclopentadiene or 1,4-hexadiene.

Heretofore, the art has failed to produce an epoxidized polymer having a saturated backbone for oxidation stability which has epoxide groups only on the ends of the block polymer chain. Such a block polymer could be cured or selectively functionalized by means of the epoxy groups at the terminal ends thereof. The functionalization would expand the utility of the polymer.

SUMMARY OF THE INVENTION

In accordance with this invention, there is provided a group of high molecular weight, epoxidized solid copolymers each of which before epoxidation is a copolymer of at least one hydrocarbon conjugated diene (I) monomer containing at least five (5) carbon atoms, with at least one carbon atom of each pair of residual double-bonded carbon atoms of polymerized conjugated diene (I) units being additionally single-bonded to two carbon atoms, and at least one hydrocarbon conjugated diene (B), which is different from conjugated diene (i) and contains at least four (4) carbon atoms, with each residual double-bonded carbon atom of polymerized conjugated diene (B) units being additionally bonded to a hydrogen atom.

The copolymer prior to epoxidation may be for example, a block copolymer wherein the terminal blocks are each a polymer of an I diene (I polymer) or a copolymer of at least one I diene and an aryl-substituted olefin, and at least one interior block in each polymer chain is a polymer of a B diene (B polymer). Thus the copolymer may comprise at least three alternating blocks:

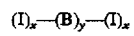

wherein I is a block of at least one polymerized conjugated diene having at least five (5) carbon atoms and the following formula

wherein $R^1$–$R^6$ are each hydrogen or a hydrocarbyl group, provided that at least one of $R^1$–$R^6$ is a hydrocarbyl group and further provided that the structure of the residual double bond in the polymerized block I has the following formula

wherein $R^I$, $R^{II}$, $R^{III}$ and $R^{IV}$ are each hydrogen or a hydrocarbyl group, provided that either both $R^I$ and $R^{II}$ are hydrocarbyl groups or both $R^{III}$ and $R^{IV}$ are hydrocarbyl groups; B is a block of a polymer of at least one conjugated diene, different from that used to polymerize the I block, having at least four (4) carbon atoms and the following formula

wherein $R^7$–$R^{12}$ are each hydrogen or a hydrocarbyl group, provided that the structure of the residual double bond in the polymerized conjugated diene of formula (3) (block B) has the following formula

wherein $R^a$, $R^b$, $R^c$ and $R^d$ are each hydrogen (H) or a hydrocarbyl group, provided that one of $R^a$ or $R^b$ is hydrogen, one of $R^c$ or $R^d$ is hydrogen and at least one of $R^a$, $R^b$, $R^c$ or $R^d$ is a hydrocarbyl group; x is 1–100, preferably 2–100, most preferably 2–30, and y is 300–35,000, preferably 1,000–5,000, and most preferably 1,500–4,000.

It will be apparent to those skilled in the art that in the residual double bond of formula (2) R', R", R''' and $R^{IV}$ may all be hydrocarbyl groups. The hydrocarbyl group or groups in the formulae (1) and (2) are the same or different and they are substituted or unsubstituted alkyl, alkenyl, cycloalkyl, cycloalkenyl, aryl, alkaryl or aralkyl groups or any isomers thereof. Examples of suitable conjugated dienes used to polymerize the I block are isoprene, 2,3-dimethyl butadiene, 2-methyl-1,3-pentadiene or myrcene. The hydrocarbyl groups in formulae (3) and (4) are the same as those described above in conjunction with the discussion of formulae (1) and (2). Suitable conjugated dienes used to polymerize the B block are 1,3-butadiene or 1,3-pentadiene. After the polymerization is completed, the block polymer may be hydrogenated, so that the B block is selectively hydrogenated to such an extent that it contains substantially none of the original unsaturation, while each of the blocks I retains a sufficient amount of its original unsaturation for conversion to the requisite epoxy groups in the terminal I blocks. Alternatively, the polymer may be epoxidized prior to selective hydrogenation of the B blocks, in which case all or most of the epoxidation occurs in the terminal I blocks, with little or no epoxidation occurring in the B blocks. The oxidative and thermal stability of the epoxidized polymer may then be improved by hydrogenation to eliminate the ethylenic unsaturation in the B blocks. The block copolymer is terminated at both ends with a block I.

In another embodiment, the polymer prior to epoxidation may be a block copolymer comprising at least three alternating blocks:

$$(A)_x\text{---}(D)_y\text{---}(A)_x$$

wherein the A block is a random or block copolymer of at least one aryl-substituted olefin, such as styrene, 2-phenyl alpha-olefins, alkylated styrene, vinyl naphthalene or alkylated vinyl naphthalene, and at least one conjugated diene of formula (1), discussed above, such as isoprene, 2,3-dimethyl butadiene, 2-methyl-1,3-pentadiene or myrcene; and D is a block of a polymer of at least one conjugated diene of formula (3), discussed above, which is different from the conjugated diene of formula (1), e.g., 1,3-butadiene or 1,3-pentadiene. When the block A has molecular weight of about 350 to about 7,500, it comprises about 50 to about 65%, preferably about 50% by mole of the aryl-substituted olefin, and about 35% to about 50%, preferably about 50% by mole of the conjugated diene of formula (1). When the block A has molecular weight of about 7,500 to about 20,000, it comprises about 1 to about 99%, preferably about 80 to about 98% by mole of the aryl-substituted olefin, and about 99 to about 1%, preferably about 2 to about 20% by mole of the conjugated diene of formula (1). When the block A has molecular weight of about 350 to about 7,500, x represents the total number of monomer units in the block A, such that the block copolymer comprises about 0.25 to about 10%, preferably about 2 to about 10% wt. of the A blocks, and y represents the total number of monomer units in the block D, such that the block copolymer comprises about 80 to about 99.5%, preferably about 80 to about 96% wt. of the D blocks. When the block A has molecular weight of about 7,500 to about 20,000, the block copolymer comprises about 0.25 to about 25%, preferably about 10 to about 20% wt. of the A blocks and about 50 to about 99.5%, preferably about 60 to about 80% wt. of the D blocks.

After this block copolymer is polymerized, it may be hydrogenated, so that the block D is selectively hydrogenated to such an extent that it contains substantially none of the original unsaturation, while each of the blocks A retains a sufficient amount of the original unsaturation of the conjugated diene present in each of the terminal A blocks for conversion to epoxy groups. As is the case with the I—B—I polymers, the A—D—A polymers may also be epoxidized prior to selective hydrogenation, with all or most of the epoxidation occurring in the terminal A blocks and little or no epoxidation occurring in the D blocks, and with hydrogenation to eliminate all or most of the unsaturation in the D blocks being carried out subsequent to epoxidation. The block copolymer of this embodiment is terminated at both ends with a block A.

Yet another embodiment is directed to an epoxidized block copolymer which prior to epoxidation comprises at least three alternating blocks:

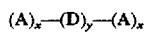

wherein the blocks I, D and A are made from the same respective monomers defined above, and the block A has a molecular weight of about 350 to about 7,500. The block copolymer comprises about 0.1 to about 50%, preferably about 1 to about 5% by weight (wt.) of the sum of blocks I and A, and about 50 to about 99.9%, preferably about 95 to about 99% wt. of the block D. As is the case with the previously discussed block polymers, the I—D—A polymers may also be selectively hydrogenated prior or subsequent to epoxidation, with all or most of the epoxidation occurring in the terminal I or A blocks and little or no epoxidation in the D blocks if epoxidation is carried out prior to hydrogenation.

The blocks A and I are referred to hereinafter as the "terminal blocks", and the blocks B and D as the "middle blocks".

Another embodiment of the invention is directed to an epoxidized random copolymer of at least one conjugated diene of formula (1) and at least one conjugated diene of formula (3), both discussed above, provided that the diene of formula (3) is different from the diene of formula (1). This random copolymer contains about 0.1 to about 25, preferably about 0.1 to about 5%, by mole of the polymerized conjugated diene of formula (1) and about 75 to about 99.9, preferably about 95 to about 99.9%, by mole of the conjugated diene of formula (3). This random copolymer may also be selectively hydrogenated prior to epoxidation so that the polymerized diene of formula (3) contains substantially none of the original unsaturation, while the polymerized diene of formula (1) retains a sufficient amount of the original unsaturation for conversion to the desired epoxy groups, or the random copolymer may be epoxidized prior to hydrogenation in which case the polymerized units of the diene of formula (1) tend to be epoxidized to a much greater degree than the polymerized units of the diene of formula (3), after which the copolymer may be hydrogenated to eliminate the unsaturation in the polymerized units of the diene of formula (3).

Another embodiment of this invention is directed to epoxidized random copolymers of at least one aryl-substituted olefin, at least one conjugated diene of formula (1) and at least one conjugated diene of formula (3), both discussed above, provided that the conjugated diene of formula (1) is different from the conjugated diene of formula (3). This random copolymer contains about 0.1 to about 15% by mole of the aryl-substituted olefin, about 0.1 to about 25%, preferably about 0.1 to about 5%, by mole of the conjugated diene of formula (1), and the remainder of the conjugated diene of formula (3). This random copolymer may also be selectively hydrogenated prior to epoxidation, so that the polymerized diene of formula (3) contains substantially none of the original unsaturation, while the polymerized diene of formula (1) retains a sufficient amount of the original unsaturation for conversion to the requisite epoxy groups, or the random copolymer may be epoxidized prior to selective hydrogenation as described in the previous paragraph in connection with random copolymers not necessarily containing polymerized aryl-substituted olefin units.

Yet another embodiment of the invention is directed to epoxidized star-branched block and random polymers. The star-branched block polymers are composed of any combination of blocks I and B, A and D, or I, D and A providing that each free end (i.e., uncoupled end) of the star polymer is either an I or an A block, respectively. The star-branched block polymers may be selectively hydrogenated prior to epoxidation to such an extent that blocks B or D contain substantially none of the original unsaturation, while each of the blocks I or A, respectively, retains a sufficient amount of the original unsaturation of the polymerized conjugated dienes present therein for conversion to epoxy groups, or the epoxidation of the star-branched polymer may be carried out first followed by selective hydrogenation as described previously for straight chain block copolymers.

The star-branched random polymers prior to epoxidation are made from any combination of dienes of formulae (1) and (3), providing that the diene of formula (3) is different from the diene of formula (1), or from at least one aryl-substituted olefin, a diene of formula (1) and a diene of formula (3), providing that the diene of formula (3) is different from the diene of formula (1). The star-branched random polymers may then be selectively hydrogenated prior to epoxidation, so that the polymerized diene of formula (3) contains substantially none of the original unsaturation, while the polymerized diene of formula (1) retains a sufficient amount of the original unsaturation for conversion to epoxy groups, or the polymer may be epoxidized before hydrogenation as described previously for straight chain random copolymers.

The copolymers of all embodiments are prepared under anionic polymerization conditions. After the selective hydrogenation reaction, the hydrogenation catalyst is removed from the polymer.

In all embodiments of this invention, whenever a reference is made to the "residual double bond" of the block or random polymer (or copolymer), it is understood to be the residual double bond prior to the selective hydrogenation or epoxidation reaction. The structure of the residual double bond can be determined in any conventional manner, as is known to those skilled in the art, e.g., by infrared (IR) analysis.

The term "original unsaturation", as used in this application, means the sum total of the unsaturated groups present in the copolymer prior to the selective hydrogenation or epoxidation reaction. The unsaturation can be quantified in any conventional manner, e.g., by reference to the Iodine Number of the polymer. For example, for a triblock copolymer of the first embodiment wherein the I blocks are polyisoprene and the B block is polybutadiene, the Iodine Number before selective hydrogenation for each of the I blocks is 373 and for the B block it is 470. After selective hydrogenation is completed, the Iodine Number for each of the I blocks is about 37 to about 373, preferably about 93 to about 373, more preferably about 186 to about 373, and most preferably about 373, and for the B block it is about 0 to about 50, and preferably about 0 to about 2.5.

In any polymers of any of the embodiments of the copolymers which may be used to prepare the epoxidized polymers of this invention, the microstructure of the polymerized conjugated diene of formula (3), e.g., blocks B or D in the block copolymers, must be such that the polymer is not excessively crystalline after the selective hydrogenation reaction, i.e., after the selective hydrogenation reaction, the polymer must retain its elastomeric properties, e.g., the polymer should contain no more than about 10% of polyethylene crystallinity. This is accomplished by introducing side branches into the polymerized conjugated diene of formula (3), e.g., by controlling the microstructure of 1,3-butadiene if it is the predominant monomer in the diene of formula (3), by using a mixture of dienes of formula (3) containing less than predominant amounts of 1,3-butadiene, or by using a single diene of formula (3) other than 1,3-butadiene. More particularly, if the conjugated diene(s) of formula (3) is predominantly (at least 50% by mole) 1,3-butadiene, the side branches are introduced into the polymer by insuring that the polymerized diene of formula (3) contains a sufficient amount of the 1,2-units to prevent the selectively hydrogenated polymer from being excessively crystalline. Thus, if the conjugated diene of formula (3) is predominantly (at least 50% by mole, e.g., 100% by mole) 1,3-butadiene, the polymerized diene of formula (3), prior to the selective hydrogenation reaction, must contain not more than about 75% wt., preferably about 10 to about 70% wt., and most preferably about 35 to about 55% wt. of the 1,4-units (1,4-microstructure), and at least about 25% wt., preferably about 30 to about 90% wt., and most preferably about 45 to about 65% wt. of the 1,2-microstructure. If the polymerized diene(s) of formula (3) contains less than 50% by mole of 1,3-butadiene, e.g., 1,3-pentadiene is used as the only diene of formula (3), the microstructure of the polymerized diene of formula (3) prior to the selective hydrogenation reaction is not critical since after hydrogenation the resulting polymer will contain substantially no crystallinity.

In all embodiments of the invention, mixtures of dienes of formulae (1) or (3) may be used to prepare block copolymers $(I)_x—(B)_y—(I)_x$, $(A)_x—(D)_y—(A)_x$ or I—D—A, or any of the random copolymers or star-branched block or random polymers subsequently converted to the epoxidized polymers of this invention. Similarly, mixtures of aryl-substituted olefins may also be used to prepare block, random or star-branched copolymers which are epoxidized in accordance with this invention. Accordingly, whenever a reference is made herein to a diene of formulae (1) or (3) or to an aryl-substituted olefin, it may encompass more than one diene of formulae (1) or (3), respectively, and more than one aryl-substituted olefin.

DETAILED DESCRIPTION OF THE INVENTION

The epoxidized block copolymers of this invention may be linear or straight chain polymers comprising three or more alternating blocks, identified above. However, epoxidized block copolymers having more than three blocks are contemplated herein, although they do not appear to exhibit better properties than the epoxidized block copolymers containing only three blocks. In addition, epoxidized star-branched block polymers containing any combination and number of blocks I and B, A and D or I, D and A are also contemplated herein, providing that they are terminated either by blocks I or A. The middle block of each three block unit of the block copolymer is substantially completely saturated, while the terminal blocks if not previously epoxidized contain controlled levels of unsaturation, providing a hydrocarbon elastomer with α-ω unsaturation which is subsequently converted to epoxy groups. When the polymers are cross-linked through the epoxy groups, the length of the middle saturated block defines the distance between crosslinks ($M_c$) in the cured elastomers. Because of the α-placement of the unsaturation, prior to epoxidation, very low levels of residual double bonds converted to epoxy groups are required to attain excellent cross-linking. The low level of unsaturation in the selectively hydrogenated and epoxidized tri-block polymer provides excellent oxidative stability to the polymers of this invention.

Without wishing to be bound by any theory, it is believed that the α-ω placement of unsaturation in the polymers of this invention prior to epoxidation and curing imparts to the polymers excellent elastomeric properties which were absent in prior art thermosetting elastomers which required a multiplicity of relatively closely spaced crosslinks.

The combination of elastomeric properties and oxidative stability possessed by the polymers of this invention makes them suitable for many end uses, such as dynamically cured thermoplastic elastomer blends, belts and hoses, white tire sidewalls, roofing, liners, impact modifiers, mechanical goods, and ionic thermoplastic elastomers.

Many variations in composition, molecular weight, molecular weight distribution, relative block lengths, microstructure, branching, crystallinity and Tg (glass transition temperature) attainable with the employ the anionic techniques employed in the preparation of our polymers will be obvious to those skilled in the art.

While not wishing to limit the molecular weight range of epoxidized solid elastomers prepared according to our invention, the minimum molecular weight for these solid polymers is at least about 15,000, preferably about 50,000 to about 2,000,000, more preferably about 80,000 to about 250,000 and most preferably about 100,000. The epoxidized block copolymers of this invention are curable. Without wishing to be bound by any theory of operability, it is believed that they can be crosslinked in a controlled manner through the epoxy groups on the terminal blocks to provide a very strong and orderly matrix of crosslinkages having almost uniform distribution of molecular weights between crosslinks, $M_c$. The epoxidized random and star-branched copolymers of this invention are also curable. The designation $M_c$, as used herein for the block copolymers means the length of the middle block. For random copolymers, $M_c$ is calculated by dividing the number average molecular weight, $M_n$, of the polymer by the average number of crosslinks per chain plus 1.

The invention will be described hereinafter in terms of the embodiments thereof summarized above. However, it will be apparent to those skilled in the art, that the invention is not limited to these particular embodiments, but, rather, it covers all of the embodiments encompassed by the broadest scope of the description of the invention.

Epoxidized Solid Block Copolymers From at Least Two Dissimilar Conjugated Dienes In this embodiment of the invention, the polymer prior to epoxidation is a block copolymer comprising at least three alternating blocks:

$(I)_x$—$(B)_y$—$(I)_x$ wherein:

I is a block of at least one polymerized conjugated diene having at least five (5) carbon atoms and the following formula

(1)

wherein $R^1$–$R^6$ are each hydrogen or a hydrocarbyl group, provided that at least one of $R^1$–$R^6$ is a hydrocarbyl group, and further provided that the structure of the residual double bond in the polymerized block I has the following formula

(2)

wherein $R^I$, $R^{II}$, $R^{III}$ and $R^{IV}$ are each hydrogen or a hydrocarbyl group, provided that either both $R^I$ and $R_{II}$ are hydrocarbyl groups or both $R_{III}$ and $R_{IV}$ are hydrocarbyl groups;

B is a block of at least one polymerized conjugated diene, different from that used to polymerize block I, having at least four (4) carbon atoms and the following formula

(3)

wherein $R^7$–$R^{12}$ are each hydrogen or a hydrocarbyl group, provided that the structure of the residual double bond in the polymerized block B has the following formula

(4)

wherein $R^a$, $R^b$, $R^c$ and $R^d$ are each hydrogen (H) or a hydrocarbyl group, provided that one of $R^a$ or $R^b$ is hydrogen, one of $R^c$ or $R^d$ is hydrogen and at least one of $R^a$, $R^b$, $R^c$ or $R^d$ is a hydrocarbyl group. In each of the I blocks, x is 1–100, preferably 2–100 and most preferably 2–30, i.e., each of the I blocks is polymerized from 1–100, preferably from 2–100, and most preferably from 2–30 monomer units. For some special applications, each of the I blocks is polymerized from 100–200 monomer units.

In each of the B blocks, y is 300 to 35,000, preferably 1,000 to 5,000, and most preferably 1,500 to 4,000, i.e., each of the B blocks is polymerized from 300 to 35,000, preferably from 1,000 to 5,000, and most preferably from 1,500 to 4,000 monomer units.

In the residual double bond of formula (2), $R^I$, $R^{II}$, $R^{III}$ and $R^{IV}$ may all be hydrocarbyl groups. The structures of the residual double bonds defined by formulae (2) and (4) are necessary to produce copolymers which can be selectively hydrogenated and epoxidized in the manner described herein to produce the selectively hydrogenated and epoxidized block and random copolymers of this invention. The block copolymer prior to epoxidation comprises about 0.1 to about 50%, preferably about 1 to about 5%, by wt. of the I blocks, and about 50 to about 99.9%, preferably about 95 to about 99%, by wt. of the B blocks.

The hydrocarbyl group or groups in the formulae (1) and (2) are the same or different and they are substituted or unsubstituted alkyl, alkenyl, cycloalkyl, cycloalkenyl, aryl, alkaryl or aralkyl groups or any isomers thereof. Suitable hydrocarbyl groups are alkyls of 1–20 carbon atoms, alkenyls of 2–20 carbon atoms, cycloalkyls of 5–20 carbon atoms, cycloalkenyls of 5–20 carbon atoms, aryls of 6–12 carbon atoms, alkaryls of 7–20 carbon atoms or aralkyls of 7–20 carbon atoms. Examples of suitable alkyl groups are methyl, ethyl, propyl, butyl, pentyl, hexyl, heptyl, octyl, decyl, methyl-decyl or dimethyldecyl. Examples of suitable alkenyl groups are ethenyl, propenyl, butenyl, pentenyl or hexenyl. Examples of suitable cycloalkyl groups are cyclohexyl or methylcyclohexyl. Examples of suitable cycloalkenyl groups are 1-, 2-, or 3-cyclohexenyl or 4-methyl-3-cyclohexenyl. Examples of suitable aryl groups are phenyl or diphenyl. Examples of suitable alkaryl groups are 4-methyl-phenyl (p-tolyl) or p-ethyl-phenyl. Examples of suitable aralkyl groups are benzyl or phenethyl. Suitable conjugated dienes of formula (1) used to polymerize the I block are isoprene, 2,3-dimethyl-butadiene, myrcene, 2-methyl-1,3-pentadiene, 3-methyl-1,3-pentadiene, 4-methyl-1,3-pentadiene, 2-phenyl-1,3-butadiene, 2-phenyl-1,3-pentadiene, 3-phenyl-1,3-pentadiene, 2,3-dimethyl-1,3-pentadiene, 2-hexyl-1,3-butadiene, 3-methyl-1,3-hexadiene, 2-benzyl-1,3-butadiene, 2-p-tolyl-1,3-butadiene or mixtures thereof, preferably isoprene, myrcene or 2-methyl-1,3-pentadiene, and most preferably isoprene.

The hydrocarbyl group or groups in the formula (3) may or may not be the same as those in formula (4). These hydrocarbyl groups are the same as those described above in conjunction with the discussion of the hydrocarbyl groups of formulae (1) and (2). Suitable monomers for the B block are 1,3-butadiene, 1,3-pentadiene, 2,4-hexadiene, 1,3-hexadiene, 1,3-heptadiene, 2,4-heptadiene, 1,3-octadiene, 2,4-octadiene, 3,5-octadiene, 1,3-nonadiene, 2,4-nonadiene, 3,5-nonadiene, 1,3 -decadiene, 2,4-decadiene, 3,5-decadiene or mixtures thereof, preferably 1,3-butadiene, 1,3-pentadiene or 1,3-hexadiene, and most preferably it is 1,3-butadiene. It is preferred that each of the B blocks is polymerized from a single monomer.

The block copolymer of this embodiment is terminated at both ends with a block I.

The scope of this embodiment and of any other embodiments of the invention wherein the block B is used also encompasses polymers wherein the central block B may be comprised of copolymers of one or more conjugated diene of formula (3) and controlled amounts (about 0.1 to about 30 mole %) of an aryl-substituted olefin, e.g., styrene or other suitable monomers (such as alkylated styrene, vinyl naphthalene or alkylated vinyl naphthalene), incorporated for control of glass transition temperature (Tg), density, solubility parameters and refractive index. Suitable aryl-substituted olefins are those described below in conjunction with the second embodiment of the invention. Similarly, the scope of this embodiment also encompasses polymers wherein the central block B may be comprised of copolymers of one or more conjugated diene of formula (3) and any other anionically polymerizable monomer capable of polymerizing with the conjugated diene of formula (3).

It will be apparent to those skilled in the art that proper choice of polymerization parameters can produce polymers to be subjected to epoxidation with a great variety of compositional and structural differences, falling within the scope of our invention. Changes in composition of the central block B control the nature of the rubbery properties of the epoxidized polymer.

The block copolymer to be subjected to epoxidation is polymerized by any conventional block copolymerization process, such as anionic polymerization, discussed in detail below. As will be apparent to those skilled in the art, the copolymer of this embodiment contains at least three alternating blocks, I—B—I, referred to herein as the triblocks or triblock units, but it may contain an unlimited number of blocks, so long as the entire block copolymer is terminated at both ends by the I blocks. It is, however, preferred that the copolymer of this embodiment contain only one triblock I—B—I. Epoxidized polymers having more than three blocks (such as five) allow crosslinking to take place at the ends and in the central portion, but maintain a controlled large distance between crosslinks of the polymer. It is important to have the block copolymer terminated at each end with the I blocks to assure that there are unsaturated groups at each end of the block copolymer enabling the block copolymer to be epoxidized and cross-linked at the terminal ends thereof.

After the block copolymer is polymerized, and before or after epoxidation it is subjected to a selective hydrogenation reaction during which the B blocks of the block copolymer are selectively hydrogenated to such an extent that they contain substantially none of the original unsaturation, while if not previously epoxidized the I blocks retain a sufficient amount of their original unsaturation to form the requisite number of epoxy groups upon subsequent epoxidation. Generally, for a block copolymer wherein the I and B blocks are polymerized from any of the monomers discussed above, the Iodine Number for the I blocks after the selective hydrogenation but before epoxidation reaction is about 10 to about 100%, preferably about 25 to about 100%, more preferably about 50 to about 100% of the Iodine Number prior to the selective hydrogenation and epoxidation reactions, and for the B blocks it is about 0 to about 10%, preferably about 0 to about 0.5%, of the Iodine Number prior to the selective hydrogenation and epoxidation reactions. The Iodine Number, as is known to those skilled in the art, is defined as the theoretical number of grams of iodine which will add to the unsaturation in 100 grams of olefin and is a quantitative measurement of unsaturation.

In this embodiment of the invention, although the microstructure of the I blocks is not critical and may consist of any combination of 1,2-, 3,4 and 1,4-units, schematically represented below for the polyisoprene blocks, when a polar compound is used during the polymerization of the I block, the I blocks comprise primarily (at least about 80%) 3,4-units, the remainder being primarily (about 20%) 1,2-units; when the polar compound is not used during the polymerization of the I block, the I blocks comprise primarily (about 80%) 1,4-units, the remainder being primarily 1,2- and 3,4-units.

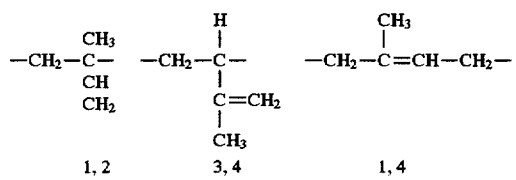

As discussed above, when the predominant monomer used to polymerize the B blocks is 1,3-butadiene, the microstructure of the B blocks should be a mixture of 1,4- and 1,2- units schematically shown below for the polybutadiene blocks:

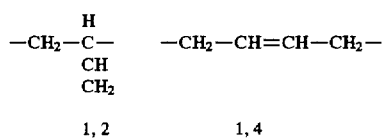

since the hydrogenation of the predominantly 1,4-microstructures produces a crystalline polyethylene segment. The microstructure of the I and B blocks (as well as of the polymerized conjugated dienes of formulae (1) or (3) in any polymers of this invention) is controlled in a conventional manner, e.g., by controlling the amount and nature of the polar compounds used during the polymerization reaction, and the reaction temperature. In one particularly preferred embodiment, the polybutadiene block contains about 55% of the 1,2- and about 45% wt. of the 1,4-microstructure. If the B block is polybutadiene, the hydrogenation of the B block containing about 50 to about 60% wt. of the 1,2-microstructure content produces an elastomeric center block which is substantially an ethylene-butene-1 copolymer having substantially no crystallinity. The reduction of the 1,2-content microstructure in the polybutadiene block in a controlled manner permits the introduction of controlled levels of crystallinity into the hydrogenated polybutadiene block which provides a "green" (uncured) strength necessary in certain applications. If the B block is polymerized from 1,3-pentadiene, it is preferred that it have predominantly (at least 50%) 1,4-microstructure, which, after hydrogenation, produces a substantially non-crystalline elastomeric block.

The terms 1,2-, 1,4-, and 3,4-microstructure or units as used in this application refer to the products of polymerization obtained, respectively, by the 1,2-, 1,4- and 3,4-, additions of monomer units into the growing polymer chain.

We surprisingly discovered that the polymerized conjugated dienes of formula (3), e.g., the B blocks, of the polymers of this invention are selectively hydrogenated in our hydrogenation process prior to epoxidation much faster than the polymerized conjugated dienes of formula (1), e.g., the I blocks. This is not evident from the teachings of Falk, discussed above, because Falk teaches that double bonds of the disubstituted 1,4-polybutadiene units are hydrogenated selectively in the presence of double bonds of the trisubstituted 1,4-polyisoprene units (which are not hydrogenated). We surprisingly discovered that the disubstituted double bonds of the 1,4-polybutadiene units are hydrogenated along with the monosubstituted double bonds of the 1,2-polybutadiene units, while the disubstituted double bonds of the 3,4-polyisoprene units are hydrogenated at a much slower rate than the aforementioned butadienes. Thus, in view of Falk's disclosure it is surprising that the disubstituted double bonds of the 1,4-polybutadiene units are hydrogenated selectively in the presence of the disubstituted double bonds of the 3,4-polyisoprene units. This is also surprising in view of the teachings of Hoxmeier, Published European Patent Application, Publication No. 0 315 280, who discloses that the disubstituted double bonds of the 1,4-polybutadiene units, monosubstituted double bonds of the 1,2-polybutadiene units and disubstituted double bonds of the 3,4-polyisoprene units are hydrogenated simultaneously at substantially the same rates. For example, for the block copolymers of this invention, wherein the I block is polyisoprene and the B block is polybutadiene, Fourier transform infrared (FTIR) analysis of selectively hydrogenated triblock polymers indicates that the hydrogenation of the double bonds of the 1,2-polybutadiene units proceeds most rapidly, followed by the hydrogenation of the double bonds of the 1,4-polybutadiene units. Infrared absorptions caused by these groups disappear prior to appreciable hydrogenation of the polyisoprene units.

After the I—B—I block copolymer is prepared, it is subjected to a selective hydrogenation reaction before or after epoxidation to hydrogenate primarily only the middle B unit of each of the triblocks. The selective hydrogenation reaction and the catalyst are described in detail below. After the hydrogenation reaction is completed, the selective hydrogenation catalyst is removed from the block copolymer, and the polymer is isolated by conventional procedures, e.g., alcohol flocculation, steam stripping of solvent or non-aqueous solvent evaporation. An antioxidant, e.g., Irganox 1076 (from Ciba-Geigy), is normally added to the polymer solution prior to polymer isolation.

Epoxidized Triblock Copolymer of at Least One Poly-Diene Center Block and Terminal Blocks of Aryl-Substituted Olefin/Diene Copolymer In this alternative embodiment of the invention, the block copolymer prior to epoxidation comprises at least one triblock of:

wherein the block A is a copolymer of at least one aryl-substituted olefin and at least one conjugated diene of formula (1), defined above. The block A is either a random or a block copolymer. When the block A has a molecular weight of about 350 to about 7,500, it comprises about 50 to about 65%, preferably about 50% by mole of the aryl-substituted olefin, and about 35% to about 50%, preferably about 50% by mole of the conjugated diene of formula (1). When the block A has a molecular weight of about 7,500 to about 20,000, it comprises about 1 to about 99%, preferably about 80 to about 98% by mole of the aryl-substituted olefin, and about 99 to about 1%, preferably about 2 to about 20% by mole of the conjugated diene of formula (1). When the block A has a molecular weight of about 350 to about 7,500, x represents the total number of monomer units in the block A, such that the block copolymer comprises about 0.25 to about 10%, preferably about 2 to about 10% wt. of the A blocks, and y represents the total number of monomer units in the block D, such that the block copolymer comprises about 80 to about 99.5%, preferably about 80 to about 96% wt. of the D blocks. When the block A has a molecular weight of about 7,500 to about 20,000, the block copolymer comprises about 0.25 to about 25%, preferably about 10 to about 20% wt. of the A blocks and about 50 to about 99.5%, preferably about 60 to about 80% wt. of the D blocks. The most preferred conjugated diene of formula (1) is isoprene. In this block copolymer, D is a block of a polymer of at least one conjugated diene of formula (3), discussed above, which is different from the conjugated diene of formula (1). The block copolymer of this embodiment may contain several, e.g., 5–7, blocks of the aforementioned formula so long as it is terminated at both ends with the block A, but, preferably, it contains only three blocks A—D—A. Suitable aryl-substituted olefins used to polymerize the A block have the formula

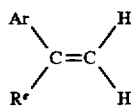

where Ar is phenyl, alkyl-substituted phenyl, naphthyl or alkyl-substituted naphthyl, $R^e$ is hydrogen, methyl, ethyl, propyl, butyl or aryl. Examples of suitable aryl-substituted olefins are styrene, 2-phenyl alpha-olefins, such as alpha-methyl styrene, 1,1-diphenyl ethylene, alkylated styrenes, vinyl naphthalene, or any alkylated vinyl naphthalenes. Suitable alkyl substituents in the alkylated styrenes or alkylated vinyl naphthalenes are methyl, ethyl, propyl, tert-butyl and sec-butyl. Each of the alkylated styrenes or vinyl naphthalenes may contain one or more alkyl substituents. Preferred aryl-substituted olefins are styrene, vinylnapthalene, alpha-methyl styrene, vinyltoluene and diphenylethylene. The microstructure of the polymerized diene of formula (1) is not critical, but can be controlled in the manner discussed above. In the most preferred embodiment, the A block of this triblock copolymer is polymerized from isoprene and styrene in the molar proportion of about 1:10. The block copolymer is polymerized by any conventional block copolymerization process, such as anionic polymerization, discussed in detail below.

Regardless of the molecular weight of the block A, the scope of this embodiment, and of any other embodiment of the invention wherein the block A is used, also encompasses polymers wherein the blocks A are prepared by, initially, polymerizing at least one aryl-substituted olefin alone, and subsequently reacting the resulting poly-aryl-substituted olefin with any compounds which, after chemical reaction with the poly-aryl-substituted olefin, will provide the residual double bonds to the A blocks, as defined above in conjunction with the discussion of the conjugated diene of formula (1). The resulting block A will therefore have substantially the same residual unsaturation (residual double bonds) on the terminal blocks A as any other block A made in accordance with this embodiment (or any other embodiment which uses the block A), i.e., by copolymerizing the aryl-substituted olefin with at least one conjugated diene of formula (1).

The block copolymer of this embodiment is terminated at both ends with a block A.

The scope of this embodiment, and of any other embodiments of the invention wherein the block D is used, also encompasses polymers wherein the central (middle) block D may be comprised of copolymers of one or more conjugated diene of formula (3) and controlled amounts (about 0.1 to about 30 mole %) of an aryl-substituted olefin, e.g., styrene or other suitable monomers (such as alkylated styrene, vinyl naphthalene or alkylated vinyl naphthalene), incorporated for control of glass transition temperature (Tg), density, solubility parameters and refractive index.

Most preferably, in this embodiment of the invention, the block A of the copolymer has a molecular weight of about 7,500 to about 20,000, the A block is polymerized from isoprene and styrene, and the D block from 1,3-butadiene, in such proportions that the final copolymer comprises about 1 to about 2% wt. of isoprene, about 25 to about 36% wt. of styrene, and about 62 to about 74% wt. of butadiene units.

After the polymerization is completed, the block copolymer may be subjected to a selective hydrogenation reaction before or after epoxidation. After selective hydrogenation, the polymer, if not previously epoxidized contains a sufficient amount of its original unsaturation in the terminal blocks A to form the requisite number of epoxy groups, thereby permitting chemical crosslinking in the manner discussed below, while the middle block D contains substantially none of the original unsaturation. For example, for a block copolymer wherein the A blocks are copolymers of styrene and isoprene and the D block is polybutadiene, the Iodine Number before selective hydrogenation and epoxidation for each of the A blocks is 5–150 and for the D block it is 250–470. After selective hydrogenation, but before epoxidation, the Iodine Number for each of the A blocks is about 5 to about 150 and for the D block it is about 0 to about 10, preferably about 0 to about 2.5, and most preferably 0. Generally, for a block copolymer wherein the A and D blocks are polymerized from any of the monomers suitable for their polymerization, discussed above, the Iodine Number for the A blocks after the selective hydrogenation is completed but before epoxidation is about 10 to about 100%, preferably about 50 to 100% of the Iodine Number prior to the selective hydrogenation and epoxidation reactions, and for the D blocks it is about 0 to about 10%, preferably 0 to about 0.5% of the Iodine Number prior to the selective hydrogenation and epoxidation reactions. Thus, in this embodiment, the block D is also selectively hydrogenated in the same manner as discussed above for the central block B of the first embodiment of the invention.

The block copolymer of this embodiment is also a solid, and, after selective hydrogenation, the unsaturated groups in the terminal A blocks of each of the triblocks provide a means of epoxidizing the copolymer in the manner discussed elsewhere in this application.

The preferred epoxidized polymers of this embodiment, wherein the A blocks have molecular weights of about 7,500 to about 20,000, while possessing the superior elastomeric properties of the thermoplastic elastomer triblocks in the uncured state, can be chemically crosslinked to render them insoluble in most organic solvents and enable them to retain elastomeric properties at very high temperatures. This elastomer is distinct from KRATON since KRATON has no unsaturated groups in the terminal styrene blocks and therefore cannot be chemically cross-linked through these blocks.

Epoxidized Triblock Copolymer of at Least One Poly-Diene Center Block, and at Least One Terminal Block of Aryl-Substituted Olefin/Diene Copolymer In this embodiment of the invention, the block copolymer prior to epoxidation comprises at least one triblock of:

I—D—A where the block I is a polymer of at least one polymerized diene of formula (1), defined above, the block D is a polymer of at least one conjugated diene of formula (3), defined above, which is different from the conjugated diene of formula (1), and the block A is a copolymer of at least one aryl-substituted olefin and at least one conjugated diene of formula (1), both defined above. The block A has a molecular weight of about 350 to about 7,500 and it comprises about 50 to about 65%, preferably about 50% by mole of the aryl-substituted olefin, and about 35 to about 50, preferably about 50% by mole of the conjugated diene of formula (1). This block copolymer comprises about 0.1 to about 50, preferably about 1 to about 5% wt. of the sum of blocks I and A, and about 50 to about 99.9, preferably about 95 to about 99% wt. of the block D. The block copolymer of this embodiment may also contain several, e.g. 5–7, blocks of the aforementioned formulae so long as it is terminated at both ends thereof with blocks I or A. The block copolymer is polymerized by any conventional block copolymerization process, such as anionic polymerization, discussed in detail below.

The scope of this embodiment of the invention also encompasses polymers wherein the central block D may be comprised of copolymers of one or more conjugated diene of formula (3) and controlled amounts (about 0.1 to about 30 mole %) of an aryl-substituted olefin, e.g., styrene or other suitable monomers (such as alkylated styrene, vinyl naphthalene or alkylated vinyl naphthalene), incorporated for control of glass transition temperature (Tg), density, solubility parameters and refractive index. Suitable aryl-substituted olefins are those described above. Similarly, the scope of this embodiment also encompasses polymers wherein the central block D may be comprised of copolymers of one or more conjugated diene of formula (3) and any other anionically polymerizable monomer capable of polymerizing with the conjugated diene of formula (3). This embodiment also encompasses polymers wherein the blocks A are prepared by, initially, polymerizing at least one aryl-substituted olefin alone and, subsequently, reacting the resulting poly-aryl-substituted olefin with any compounds which, after chemical reaction with the poly-aryl-substituted olefin, will provide the residual double bonds to the A blocks, as defined above in conjunction with the discussion of the conjugated diene of formula (1). The resulting block A will therefore have substantially the same residual unsaturation (residual double bonds) on the terminal blocks A prior to epoxidation as any other block A made in accordance with this embodiment.

After the polymerization is completed the block copolymer may be subjected to a selective hydrogenation reaction before or after epoxidation. After selective hydrogenation, the polymer, if not previously epoxidized, contains a sufficient amount of its original unsaturation in the terminal blocks I and A to provide the requisite number of epoxy groups thereby permitting chemical crosslinking in the manner discussed below, while the middle block D contains substantially none of the original unsaturation. Generally, for a block copolymer wherein the I, D and A blocks are polymerized from any of the monomers suitable for their polymerization, as defined above, the Iodine Number for the I and A blocks after the selective hydrogenation is completed but before epoxidation is about 10 to about 100% of the Iodine Number prior to the selective hydrogenation reaction, and for the D blocks it is about 0 to about 10%, preferably about 0 to about 0.5% of the Iodine Number prior to the selective hydrogenation reaction. Thus, in this embodiment, the block D is also selectively hydrogenated in the same manner as discussed above, while the terminal blocks I and A before epoxidation retain a substantial amount of their original unsaturation.

The block copolymer of this embodiment is also a solid, and, after selective hydrogenation and epoxidation, the epoxy groups in the terminal I and A blocks of each of the triblocks provide a means of crosslinking the copolymer in the manner discussed elsewhere in this application.

Epoxidized Random Copolymers

Random copolymers of this invention prior to epoxidation have controlled amounts of unsaturation incorporated randomly in an otherwise saturated backbone. In contrast to EPDM, the level of unsaturation can be inexpensively and easily controlled, e.g., to produce polymers having Iodine Numbers before epoxidation of about 5 to about 100, to provide a wide variation in curing rate of the epoxidized polymers.

In one embodiment, the random copolymers subjected to epoxidation are polymerized from the same monomers used to polymerize the block copolymers $(I)_x$—$(B)_y$—$(I)_x$, i.e., from at least one conjugated diene of formula (1) and at least one conjugated diene of formula (3), both defined above, providing that the diene of formula (1) is different from the diene of formula (3). This random copolymer contains about 1.0 to about 25%, preferably about 1.0 to about 10% by mole of the polymerized conjugated diene of formula (1) and about 75 to about 99%, preferably about 90 to about 99% by mole of the polymerized conjugated diene of formula (3). Suitable conjugated dienes of formula (1) are exemplified above. The most preferred conjugated diene of formula (1) for the copolymerization of these random copolymers is isoprene. Suitable conjugated dienes of formula (3) are also exemplified above. 1,3-Butadiene is the most preferred conjugated diene of formula (3) for the polymerization of the random copolymer of this embodiment. Thus, most preferably, in this embodiment, the random copolymer is polymerized from isoprene and 1,3-butadiene, and it contains about 1 to about 20% wt. of the isoprene units and about 80 to about 99% wt. of the butadiene units. The isoprene unit have primarily (i.e., about 50 to about 90% wt.) the 3,4-microstructure.

In another embodiment, the random copolymers subjected to epoxidation are polymerized from the same monomers used to polymerize the block copolymers $(A)_x$—$(D)_y$—$(A)_x$, i.e., from at least one aryl-substituted olefin, at least one conjugated diene of formula (1), and at least one conjugated diene of formula (3), providing that the conjugated diene of formula (1) is different from the conjugated diene of formula (3) used in the polymerization. The conjugated dienes of formulae (1) and (3) and the aryl-substituted olefins are defined above. This alternative random copolymer contains about 0.3 to about 15% by mole of the aryl-substituted olefin, about 1.0 to about 25%, preferably about 1.0 to about 10%, by mole of the conjugated diene of formula (1), the remainder being the conjugated diene of formula (3).

The random copolymers before or after epoxidation are then subjected to the selective hydrogenation reaction discussed above for the block copolymers, during which polymerized conjugated diene units of formula (3) are substantially completely hydrogenated, while the polymerized conjugated diene units of formula (1), if not previously epoxidized, are hydrogenated to a substantially lesser extent, i.e., to such an extent that they retain a sufficient amount of their original unsaturation for conversion to the requisite number of epoxy groups, thereby producing solid elastomers having random unsaturation proportional to the unsaturation in the polymerized dienes of formula (1). For example, for a random copolymer polymerized from a diene of formula (1) and a different diene of formula (3), the Iodine Number before selective hydrogenation and epoxidation for the polymer is about 450. After selective hydrogenation, but before epoxidation, the Iodine Number for the polymer is about 10 to about 100, most of the unsaturation being contributed by the diene of formula (1). Generally, in such random copolymers, the Iodine Number for the polymerized dienes of formula (1) after the selective hydrogenation reaction but before epoxidation is about 10 to about 100%, preferably about 25 to about 100%, more preferably about 50 to about 100% of the Iodine Number prior to the selective hydrogenation reaction, and for the polymerized dienes of formula (3) it is about 0 to about 10%, preferably about 0 to about 0.5% of the Iodine Number prior to the selective hydrogenation reaction. The Iodine Number for the unepoxidized polymerized dienes of formulae (1) and (3) before and after the hydrogenation reactions in these random copolymers can be estimated by any conventional techniques, e.g., by Fourier Transform Infrared (FTIR) analysis, as will be apparent to those skilled in the art.

Similarly, for a random copolymer of aryl-substituted olefins, a conjugated diene of formula (1) and a conjugated diene of formula (3), different from the conjugated diene of formula (1), the Iodine Number before selective hydrogenation and epoxidation for the polymer is about 300 to about 450. After selective hydrogenation but before epoxidation, the Iodine Number for the polymer is about 5 to about 100, most of the unsaturation measured by the Iodine Number being contributed by the polymerized diene of formula (1). Generally, for the random copolymer of this embodiment the Iodine Number after the selective hydrogenation reaction but before epoxidation, for the polymerized diene of formula (1) is about 10 to about 100% of the Iodine Number prior to the selective hydrogenation reaction, and for the polymerized diene of formula (3), it is about 0 to about 10% of the Iodine Number prior to the selective hydrogenation reaction.

Epoxidized Star-Branched Polymers

The invention is also directed to epoxidized star-branched block and random polymers.

The star-branched block polymers prior to epoxidation are made from any combination of blocks I and B, A and D, or I, D and A, defined above, providing that each free end (i.e., the uncoupled end) of the star-branched polymer is either an I or an A block in the star-branched block polymers made from blocks I and B, A and D or I, D and A. The star-branched I—B block copolymers comprise about 0.1 to about 50%, preferably about 1 to about 5% by wt. of the I blocks and about 50 to about 99.9% by wt. of the B blocks. The star-branched A—D block copolymers, similarly to the A—D—A block copolymers, may have the A blocks of a low molecular weight (about 350 to about 7,500) or of a high molecular weight (about 7,500 to about 20,000). When the block A has a molecular weight of about 350 to about 7,500, it comprises about 50 to about 65%, preferably about 50% by mole of the aryl-substituted olefin, and about 35% to about 50%, preferably about 50% by mole of the conjugated diene of formula (1). When the block A has a molecular weight of about 7,500 to about 20,000, it comprises about 1 to about 99%, preferably about 80 to about 98% by mole of the aryl-substituted olefin, and about 99 to about 1%, preferably about 2 to about 20% by mole of the conjugated diene of formula (1). When the block A has a molecular weight of about 350 to about 7,500, the A—star-branched block copolymer comprises about 0.25 to about 10%, preferably about 2 to about 10% wt. of the A blocks, and about 80 to about 99.5%, preferably about 80 to about 96% wt. of the D blocks. When the block A has a molecular weight of about 7,500 to about 20,000, the A—D star-branched block copolymer comprises about 0.25 to about 25%, preferably about 10 to about 20% wt. of the A blocks and about 50 to about 99.5%, preferably about 60 to about 80% wt. of the D blocks. In the star-branched I—D—A block copolymers, the block A has a molecular weight of about 350 to about 7,500. The star-branched I—D—A block copolymers comprise about 0.1 to about 50%, preferably about 1 to about 5% wt. of the sum of blocks I and A, and about 50 to about 99.9%, preferably about 95 to about 99% wt. of the blocks D.

The star-branched block polymers may be selectively hydrogenated before or after epoxidation to such an extent that blocks B or D contain substantially none of the original unsaturation, while each of the blocks I and A, respectively, if not previously epoxidized, retains a sufficient amount of the original unsaturation of the conjugated dienes present in these blocks for conversion to the requisite epoxy groups. Thus, for the I—B star-branched block polymer, after the selective hydrogenation reaction but before epoxidation, the Iodine Number for the I blocks is about 10 to about 100%, preferably about 25 to about 100%, more preferably about 50 to about 100% of their Iodine Number prior to the selective hydrogenation reaction, and for the B blocks it is about 0 to about 10%, preferably about 0 to about 0.5% of the Iodine Number prior to the selective hydrogenation and epoxidation reactions. For the A—D star-branched block polymer, after the selective hydrogenation reaction but before epoxidation, the Iodine Number for the A blocks is about 10 to about 100%, preferably about 25 to about 100%, more preferably about 50 to about 100% of the Iodine Number prior to the selective hydrogenation and epoxidation reactions, and for the D blocks it is about 0 to about 10%, preferably about 0 to about 0.5% of the Iodine Number prior to the selective hydrogenation and epoxidation reactions. Similarly, for the I—D—A star-branched block polymer, the Iodine Number for each of the I and A blocks after the selective hydrogenation is completed but before epoxidation is about 10 to about 100% of the Iodine Number prior to the selective hydrogenation and epoxidation reactions, and for the D blocks it is about 0 to about 10%, preferably about 0 to about 0.5% of the Iodine Number prior to the selective hydrogenation and epoxidation reactions. Thus, in this embodiment, the block D is also selectively hydrogenated in the same manner as discussed above for the central blocks B and D of the other embodiments of the invention.

The star-branched random copolymers prior to epoxidation are made from any combination of at least one diene of formula (1) and at least one diene of formula (3), or from any combination of at least one aryl-substituted olefin, at least one diene of formula (1) and at least one diene of formula (3), all of which are the same as those discussed above in conjunction with the block and random copolymers. The star-branched random copolymers of the dienes of formulae (1) and (3), which must be different from each other, comprise about 1 to about 25%, preferably about 1 to about 10% by mole of the polymerized conjugated diene of formula (1) and about 75 to about 99%, preferably about 90 to about 99% by mole of the polymerized conjugated diene of formula (3). The star-branched random copolymers of the aryl-substituted olefin, at least one diene of formula (1) and at least one diene of formula (3), different from the diene of formula (1), comprise about 0.3 to about 15% by mole of the aryl-substituted olefin, about 1 to about 25%, preferably about 1 to about 10% by mole of the conjugated diene of formula (1), and the remainder of the conjugated diene of formula (3). The star-branched random copolymers may also be selectively hydrogenated to such an extent that the polymerized diene units of formula (3) contain substantially none of the original unsaturation, while the polymerized diene units of formula (1), if not previously epoxidized, retain a sufficient amount of the original unsaturation for conversion to the requisite number of epoxy groups. Thus, for the star-branched random polymer of the conjugated diene of formula (1) and a different diene of formula (3), both identified above, the Iodine Number for the polymerized diene of formula (1), after the selective hydrogenation reaction but before epoxidation, is about 10 to about 100%, preferably about 25 to about 100%, more preferably about 50 to about 100% of the Iodine Number prior to the selective hydrogenation and epoxidation reactions, and for the polymerized diene of formula (3) it is about 0 to about 10%, preferably about 0 to about 0.5% of the Iodine Number prior to the selective hydrogenation and epoxidation reactions. Similarly, for the star-branched random polymers made from at least one aryl-substituted olefin, at least one diene of formula (1) and at least one diene of formula (3), the Iodine Number for the polymerized diene of formula (1), after the selective hydrogenation reaction but before epoxidation, is about 10 to about 100%, preferably about 25 to about 100%, more preferably about 50 to about 100% of the Iodine Number prior to the selective hydrogenation and epoxidation reactions, and for the polymerized diene of formula (3) it is about 0 to about 10%, preferably about 0 to about 0.5% of the Iodine Number prior to the selective hydrogenation and epoxidation reactions.

Polymerization Reaction

The block copolymers which are subjected to epoxidation and, in most cases selective hydrogenation in accordance with this invention are prepared by any known block polymerization processes, preferably by an anionic polymerization process. Anionic polymerization is well known in the art, and it is utilized in the production of a variety of commercial polymers. An excellent comprehensive review of the anionic polymerization processes appears in the text ADVANCES IN OLYMER SCIENCE 56, ANIONIC POLYMERIZATION, pp. 1–90, Springer-Verlag, Berlin, Heideberg, New York, Tokyo 1984 in a monograph entitled ANIONIC POLYMERIZATION OF NON-POLAR MONOMERS INVOLVING LITHIUM, by R. N. Young, R. P. Quirk and L. J. Fetters, incorporated herein by reference. The anionic polymerization process is conducted in the presence of a suitable anionic catalyst (also known as an initiator), such as n-butyl-lithium, sec-butyl-lithium, t-butyl-lithium, sodium naphthalide or cumyl potassium. The amount of the catalyst and the amount of the monomer in the polymerization reaction dictate the molecular weight of the polymer. The polymerization reaction is conducted in solution using an inert solvent as the polymerization medium, e.g., aliphatic hydrocarbons, such as hexane, cyclohexane or heptane, or aromatic solvents, such as benzene or toluene. In certain instances, inert polar solvents, such as tetrahydrofuran, can be used alone as a solvent, or in a mixture with a hydrocarbon solvent.

The block polymerization process will be exemplified below for the polymerization of the first embodiment of the invention, and specifically for the preferred embodiment thereof, i.e., a triblock of polyisoprene-polybutadiene-polyisoprene which is subsequently epoxidized. However, it will be apparent to those skilled in the art that the same process principles can be used for the polymerization of all copolymers of the invention.

The process, when using a lithium-based catalyst, comprises forming a solution of the isoprene monomer in an inert hydrocarbon solvent, such as cyclohexane, modified by the presence therein of one or more polar compounds selected from the group consisting of ethers, thioethers and tertiary amines, e.g., tetrahydrofuran. The polar compounds are necessary to control the microstructure of the butadiene center block, i.e., the content of the 1,2-structure thereof. The higher the content of the polar compounds, the higher will be the content of the 1,2-structure in these blocks. Since the presence of the polar compound is not essential in the formation of the first polymer block with many initiators unless a high 3,4-structure content of the first block is desired, it is not necessary to introduce the polar compound at this stage, since it may be introduced just prior to or together with the addition of the butadiene in the second polymerization stage. Examples of polar compounds which may be used are dimethyl ether, diethyl ether, ethyl methyl ether, ethyl propyl ether, dioxane, diphenyl ether, tripropyl amine, tributyl amine, trimethyl amine, triethyl amine, and N-,N-, N'-,N'-tetramethyl ethylene diamine. Mixtures of the polar compounds may also be used. The amount of the polar compound depends on the type of the polar compound and the polymerization conditions as will be apparent to those skilled in the art. The effect of the polar compounds on the polybutadiene microstructure is detailed in ANTKOWIAK et al, TEMPERATURE AND CONCENTRATION EFFECTS ON POLAR-MODIFIED ALKYL LITHIUM POLYMERIZATIONS AND COPOLYMERIZATIONS, JOURNAL OF POLYMER SCIENCE: Part A-1, Vol. 10, 1319–1334 (1972), incorporated herein by reference. The polar compounds also accelerate the rate of polymerization. If monomers other than butadiene, e.g., pentadiene, are used to copolymerize the central blocks B or C, polar compounds are not necessary to control the microstructure because such monomers will inherently produce polymers which do not possess crystallinity after hydrogenation.

When the alkyl lithium-based initiator, a polar compound and an isoprene monomer are combined in an inert solvent, polymerization of the isoprene proceeds to produce the first terminal block whose molecular weight is determined by the ratio of the isoprene to the initiator. The "living" polyisoprenyl anion formed in this first step is utilized as the catalyst for further polymerization. At this time, butadiene monomer is introduced into the system and block polymerization of the second block proceeds, the presence of the polar compound now influencing the desired degree of branching (the 1,2-structure content) in the polybutadiene block. The resulting product is a living diblock polymer having a terminal anion and a lithium counterion. The living diblock polymer serves as a catalyst for the growth of the final isoprene block, formed when isoprene monomer is again added to the reaction vessel to produce the final polymer block, resulting in the formation of the I—B—I triblock. Upon completion of polymerization, the living anion, now present at the terminus of the triblock, is destroyed by the addition of a proton donor, such as methyl alcohol or acetic acid. The polymerization reaction is usually conducted at a temperature of between 0° C. and about 100° C., although higher temperatures can be used. Control of a chosen reaction temperature is desirable since it can influence the effectiveness of the polar compound additive in controlling the polymer microstructure. The reaction temperature can be, for example, from 50° to 80° C. The reaction pressure is not critical and varies from atmospheric to about 100 psig. If the polar compounds are utilized prior to the polymerization of the first I segment, I blocks with high 3,4-unit content are formed. If polar compounds (some of which can be Lewis bases) are added after the initial I segment is prepared, the first I segment will possess a high percentage of 1,4-microstructure (which is trisubstituted), and the second I segment will have a high percentage of 3,4-microstructure.

The production of triblock polymers having a high 1,4-unit content on both of the terminal I blocks is also possible by the use of coupling techniques illustrated below for a polyisoprene-polybutadiene-polyisoprene block copolymer:

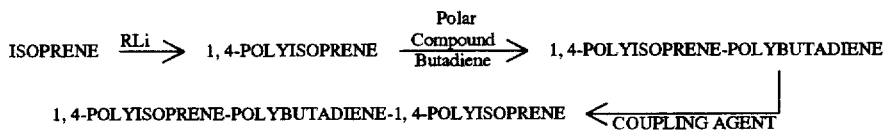

The substitution of myrcene for the isoprene during the polymerization of the I block insures the incorporation of a high proportion of trisubstituted double bonds, even in the presence of polar compounds since myrcene contains a pendant trisubstituted double bond which is not involved in the polymerization process. In a coupling process similar to that described above, block polymers containing polyisoprene end blocks (or any other polymerized monomer suitable for use in the I block) having a high 3,4-microstructure content can be obtained by adding the polar compound prior to the isoprene (or another monomer) polymerization.

The use of the coupling technique for the production of triblock polymers greatly reduces the reaction time necessary for the completion of polymerization, as compared to a sequential addition of isoprene, followed by butadiene, followed by isoprene. Such coupling techniques are well known and utilize coupling agents, such as esters, $CO_2$, iodine, dihaloalkanes, silicon tetrachloride, divinyl benzene, alkyl trichlorosilanes and dialkyl dichlorosilanes. The use of tri- or tetra-functional coupling agents, such as alkyl trichlorosilanes or silicon tetrachloride, permits the formation of macromolecules having 1-or 2- main chain branches, respectively. The addition of divinyl benzene as a coupling agent has been documented to produce molecules having up to 20 or more separately joined segments.

The use of some of the coupling agents provides a convenient means of producing the star-branched block and random polymers which are subsequently epoxidized. The star-branched block polymers are made from any combination of blocks I and B, A and D or I, D and A, discussed above, providing that each free end (i.e., uncoupled end) of the star-branched polymer is either an I or an A block, respectively. The star-branched random polymers are made from any combination of at least one diene of formula (1) and at least one diene of formula (3), different from the diene of formula (1), or from at least one aryl-substituted olefin, at least one diene of formula (1), and at least one diene of formula (3), different from the diene of formula (1). The molecular weight of the star-branched block and random copolymers will depend on the number of branches in each such copolymer, as will be apparent to those skilled in the art. Suitable coupling agents and reactions are disclosed in the following references which are incorporated herein by reference: U.S. Pat. Nos. 3,949,020; 3,594,452; 3,598,887; 3,465,065; 3,078,254; 3,766,301; 3,632,682; 3,668,279; and Great Britain patents 1,014,999; 1,074,276; 1,121,978.

The random copolymers which are subjected to epoxidation in accordance with this invention are polymerized and/or coupled in a similar fashion, but all monomers, e.g., isoprene and butadiene, are mixed in a proper ratio prior to the reaction with the polar compound-modified alkyllithium. In the random polymer preparation, of course, only one stage is necessary.

Selective Hydrogenation

The selective hydrogenation reaction will also be described below using a triblock of polyisoprene-polybutadiene-polyisoprene not previously subjected to epoxidation as an example. However, it will be apparent to those skilled in the art that any polymers of this invention can be selectively hydrogenated in the same manner.

The block copolymer is selectively hydrogenated to saturate the middle (polybutadiene) block of each of the triblocks. The method of selectively hydrogenating the polybutadiene block is similar to that of Falk, "Coordination Catalysts For The Selective Hydrogenation of Polymeric Unsaturation", JOURNAL OF POLYMER SCIENCE: PART A-1, Volume 9, 2617–2623 (1971), but it is conducted with the novel hydrogenation catalyst and process used herein. Any other known selective hydrogenation methods may also be used, as will be apparent to those skilled in the art, but it is preferred to use the method described herein. In summary, the selective hydrogenation method preferably used herein comprises contacting the previously-prepared block copolymer with hydrogen in the presence of the novel catalyst composition.

The novel hydrogenation catalyst composition and hydrogenation process are described in detail in application Ser. No. 07/466,136, filed Jan. 16, 1990. The hydrogenation catalyst composition is synthesized from at least one transition metal compound and an organometallic reducing agent.

Suitable transition metal compounds are compounds of metals of Group IVb, Vb, VIb, or VIII, preferably IVb or VIII of the Periodic Table of the Elements, published in LANGE's HANDBOOK OF CHEMISTRY (13th Edition, 1985, McGraw-Hill Book Company, New York, John A. Dean, Editor). Non-limiting examples of such compounds are metal halides, e.g., titanium tetrachloride, vanadium tetrachloride; vanadium oxytrichloride, titanium and vanadium alkoxides, wherein the alkoxide moiety has a branched or unbranched alkyl radical of 1 to about 20 carbon atoms, preferably 1 to about 6 carbon atoms. Preferred transition metal compounds are metal carboxylates or alkoxides of Group IVb or VIII of the Periodic Table of the Elements, such as nickel (II) 2-ethylhexanoate, titanium isopropoxide, cobalt (II) octoate, nickel (II) phenoxide and ferric acetylacetonate.

The organometallic reducing agent is any one or a combination of any of the materials commonly employed to activate Ziegler-Natta olefin polymerization catalyst components containing at least one compound of the elements of Groups Ia, IIa, IIb, IIIa, or IVa of the Periodic Table of the Elements. Examples of such reducing agents are metal alkyls, metal hydrides, alkyl metal hydrides, alkyl metal halides, and alkyl metal alkoxides, such as alkyllithium compounds, dialkylzinc compounds, trialkylboron compounds, trialkylaluminum compounds, alkylaluminum halides and hydrides, and tetraalkylgermanium compounds. Mixtures of the reducing agents may also be employed. Specific examples of useful reducing agents include n-butyllithium, diethylzinc, di-n-propylzinc, triethylboron, diethylaluminumethoxide, triethylaluminum, trimethylaluminum, triisobutylaluminum, tri-n-hexylaluminum, ethylaluminum dichloride, dibromide, and dihydride, isobutyl aluminum dichloride, dibromide, and dihydride, diethylaluminum chloride, bromide, and hydride, di-n-propylaluminum chloride, bromide, and hydride, diisobutylaluminum chloride, bromide and hydride, tetramethylgermanium, and tetraethylgermanium. Organometallic reducing agents which are preferred are Group IIIa metal alkyls and dialkyl metal halides having 1 to about 20 carbon atoms per alkyl radical. More preferably, the reducing agent is a trialkylaluminum compound having 1 to about 6 carbon atoms per alkyl radical. Other reducing agents which can be used herein are disclosed in Stevens et al, U.S. Pat. No. 3,787,384, column 4, line 45 to column 5, line 12 and in Strobel et al, U.S. Pat. No. 4,148,754, column 4, line 56 to column 5, line 59, the entire contents of both of which are incorporated herein by reference. Particularly preferred reducing agents are metal alkyl or hydride derivatives of a metal selected from Groups Ia, IIa and IIIa of the Periodic Table of the Elements, such as n-butyl lithium, sec-butyl lithium, n-hexyl lithium, phenyl-lithium, triethylaluminum, tri-isobutylaluminum, trimethylaluminum, diethylaluminum hydride and dibutylmagnesium.

The molar ratio of the metal derived from the reducing agent to the metal derived from the transition metal compound will vary for the selected combinations of the reducing agent and the transition metal compound, but in general it is about 1:1 to about 12:1, preferably about 1.5:1 to about 8:1, more preferably about 2:1 to about 7:1 and most preferably about 2.5:1 to about 6:1. It will be apparent to those skilled in the art that the optimal ratios will vary depending upon the transition metal and the organometallic agent used, e.g., for the trialkylalumium/nickel(II) systems the preferred aluminum: nickel molar ratio is about 2.5:1 to about 4:1, for the trialkylaluminum/cobalt(II) systems the preferred aluminum: cobalt molar ratio is about 3:1 to about 4:1 and for the trialkylaluminum/titanium(IV) alkoxides systems, the preferred aluminum: titanium molar ratio is about 3:1 to about 6:1.

The mode of addition and the ratio of the reducing agent to the transition metal compound are important in the production of the novel hydrogenation catalyst having superior selectivity, efficiency and stability, as compared to prior art catalytic systems. During the synthesis of the hydrogenation catalysts it is preferred to maintain the molar ratio of the reactants used to synthesize the catalyst substantially constant. This can be done either by the addition of the reducing agent as rapidly as possible to a solution of the transition metal compound, or by a substantially simultaneous addition of the separate streams of the reducing agent and the transition metal compound to a catalyst synthesis vessel in such a manner that the selected molar ratios of the metal of the reducing agent to the metal of the transition metal compound are maintained substantially constant throughout substantially the entire time of addition of the two compounds. The time required for the addition must be such that excessive pressure and heat build-up are avoided, i.e., the temperature should not exceed about 80° C. and the pressure should not exceed the safe pressure limit of the catalyst synthesis vessel.

In a preferred embodiment, the reducing agent and the transition metal compound are added substantially simultaneously to the catalyst synthesis vessel in such a manner that the selected molar ratio of the reducing agent to the transition metal compound is maintained substantially constant during substantially the entire time of the addition of the two compounds. This preferred embodiment permits the control of the exothermic reaction so that the heat build-up is not excessive, and the rate of gas production during the catalyst synthesis is also not excessive-accordingly the gas build-up is relatively slow. In this embodiment, carried out with or without solvent diluent, the rate of addition of the catalyst components is adjusted to maintain the synthesis reaction temperature at or below about 80° C., which promotes the formation of the selective hydrogenation catalyst. Furthermore, the selected molar ratios of the metal of the reducing agent to the metal of the transition metal compound are maintained substantially constant throughout the entire duration of the catalyst preparation when the simultaneous mixing technique of this embodiment is employed.

In another embodiment, the catalyst is formed by the addition of the reducing agent to the transition metal compound. In this embodiment, the timing and the order of addition of the two reactants is important to obtain the hydrogenation catalyst having superior selectivity, efficiency and stability. Thus, in this embodiment, it is important to add the reducing agent to the transition metal compound in that order in as short a time period as practically possible. In this embodiment, the time allotted for the addition of the reducing agent to the transition metal compound is critical for the production of the catalyst. The term "as short a time period as practically possible" means that the time of addition is as rapid as possible, such that the reaction temperature is not higher than about 80° C. and the reaction pressure does not exceed the safe pressure limit of the catalyst synthesis vessel. As will be apparent to those skilled in the art, that time will vary for each synthesis and will depend on such factors as the types of the reducing agents, the transition metal compounds and the solvents used in the synthesis, as well as the relative amounts thereof, and the type of the catalyst synthesis vessel used. For purposes of illustration, a solution of about 15 ml of triethylaluminum in hexane should be added to a solution of nickel(II) octoate in mineral spirits in about 10–30 seconds. Generally, the addition of the reducing agent to the transition metal compound should be carried out in about 5 seconds (sec) to about 5 minutes, depending on the quantities of the reagents used. If the time period during which the reducing agent is added to the transition metal compound is prolonged, e.g., more than 15 minutes, the synthesized catalyst is less selective, less stable and may be heterogeneous.

In the embodiment wherein the reducing agent is added as rapidly as possible to the transition metal compound, it is also important to add the reducing agent to the transition metal compound in the aforementioned sequence to obtain the novel catalyst. The reversal of the addition sequence, i.e., the addition of the transition metal compound to the reducing agent, or the respective solutions thereof, is detrimental to the stability, selectivity, activity and homogeneity of the catalyst and is therefore undesirable.

In all embodiments of the hydrogenation catalyst synthesis, it is preferred to use solutions of the reducing agent and the transition metal compound in suitable solvents, such as hydrocarbon solvents, e.g., cyclohexane, hexane, pentane, heptane, benzene, toluene or mineral oils. The solvents used to prepare the solutions of the reducing agent and of the transition metal compound may be the same or different, but if they are different, they must be compatible with each other so that the solutions of the reducing agent and the transition metal compound are fully soluble in each other.

The hydrogenation process comprises contacting the unsaturated polymer to be hydrogenated with an amount of the catalyst solution containing about 0.1 to about 0.5, preferably about 0.2 to about 0.3 mole percent of the transition metal based on moles of the polymer unsaturation. The hydrogen partial pressure is about 5 psi to about several hundred psi, but preferably it is about 10 to about 100 psi. The temperature of the hydrogenation reaction mixture is about 25° to about 80° C., since higher temperatures may lead to catalyst deactivation. The length of the hydrogenation reaction may be as short as 30 minutes and, as will be apparent to those skilled in the art, depends to a great extent on the actual reaction conditions employed. The hydrogenation process may be monitored by any conventional means, e.g., infra-red spectroscopy, hydrogen flow rate, total hydrogen consumption, or any combination thereof.

After the hydrogenation reaction is completed, the hydrogenation catalyst must be removed from the polymer by any conventional means, for example, in the case of a nickel-based catalyst by contacting the polymer with a complexing agent, such as a high molecular weight diamine (e.g., Jeffamine D-2000 from Texaco), and then with an acid, e.g., sulfuric, phosphoric or hydrochloric acid, in the presence of an oxidizing agent, e.g., air or hydrogen peroxide. The polymer solution is then water-washed and the polymer isolated by conventional methods, e.g., steam or alcohol flocculation or solvent evaporation.

Epoxidation Reaction

The solid block or random elastomeric copolymer may be epoxidized by such conventional and well-known means as described in U.S. Pat. No. 3,448,174. Thus, the starting copolymer may be subjected to the action of any suitable conventional epoxidizing agent. Conveniently the epoxidation is carried out in solution in a conventional inert volatile organic solvent for the copolymer. For example, the solvent may be a hydrocarbon, such as an aliphatic or cycloaliphatic hydrocarbon, e.g., hexane, cyclohexane, etc., or an aromatic hydrocarbon e.g., benzene, toluene, and the like, or a halogen-substituted hydrocarbon, e.g., methylene chloride or dichloroethylene. The concentration of the copolymer in the solvent is in no way critical, and it may be mentioned by way of non-limiting example, that solutions containing 5% or less to 40% or more may be used. The epoxidizing agent is frequently a peroxy acid, especially an organic peroxy acid, either aliphatic, as in peracetic acid, or aromatic, as in perbenzoic acid or m-chloroperbenzoic acid. The reaction conditions are not critical. The reaction proceeds at room temperature, but heat (e.g., 50°–150° C. or higher) may be applied if desired to speed it up. The amount of epoxidizing agent is not critical, and the optimum amount in any given case will depend upon such variables as the particular epoxidizing agent used, the degree of epoxidation desired, the particular starting copolymer used (especially its degree of unsaturation), and the like. The amount of epoxidizing agent may be roughly equivalent to the unsaturation in the starting copolymer as determined by iodine number, although smaller amounts, e.g., 0.1 molar equivalent (especially when only partial epoxidation is desired), may of course also be used. No special manipulation of the reaction mixture is necessary; for example, it is sufficient to simply stir the mixture, say for a period of 2–24 hours. The resulting epoxidized polymer may be recovered from the reaction solution in any suitable manner, for example by precipitating it with a non-solvent (e.g., ethanol or water) or by evaporation of the solvent. The infrared spectrum of the dried epoxidized copolymer shows absorption due to epoxide (about 837 cm.$^{-1}$), and when the amount of epoxidizing agent is equivalent to the unsaturation in a selectively hydrogenated copolymer, essentially no residual absorption due to unsaturation. A solution of the epoxidized copolymer is gelled immediately by the addition of boron trifluoride, whereas before treatment with the peroxy acid, no gelation is effected by $BF_3$.

Until the instant invention, epoxidized hydrocarbon elastomers have not been produced which have the capability of maintaining a large distance large distance between crosslinks (high $M_c$) after curing. Our invention provides epoxidized block hydrocarbon polymers capable of being cured to a perfect network with a distance between crosslinks substantially equivalent to the dimensions of the uncured elastomeric molecule as more specifically described hereinafter. In addition to the expected improvements in elastomeric properties, the saturated main chain of the polymers of our invention provides a high degree of oxidative and thermal stability. Unique materials can also be obtained by chemical modifications of the epoxidized block polymers of this invention, also as described hereinafter, since such modifications can be carried out selectively only at the epoxidized terminal ends of the molecules.

Crosslinking and Subsequent Reactions

The crosslinking of the epoxidized, and optionally selectively hydrogenated block and random polymers of this invention is conducted in a conventional manner by contacting the block copolymer with a suitable crosslinking agent or a combination of such agents. The crosslinking process produces a copolymer having uniform distance between cross-links.

More specifically, the epoxy groups in the epoxidized copolymer render such copolymer curable or cross-linkable by conventional means such as disclosed, for example in U.S. Pat. No. 3,448,174. Such means include, for example treatment with any of the various reagents known to be effective with polymers containing epoxy groups, e.g., $BF_3$, $BF_3$ complexes, $AlCl_3$, $AlBr_3$, $SnCl_4$, etc., mineral acids (HCl, HBr, $H_2SO_4$, etc.), and carboxylic acids such as maleic, adipic, phthalic, etc. These reagents may be used to cure the epoxidized copolymer in the neat state or in solution if added in amounts less than equivalent to the epoxy groups. If these acids are added in amounts more than equivalent to the epoxy groups, the gelation will be suppressed in favor of a ring opening reaction. Thus, solutions can be gelled (cured) rapidly with a reagent such as boron trifluoride even at room temperature.

In addition to use of the foregoing reagents, the epoxidized copolymers may be cured by radiation cross-linking using techniques well-known in the art which employ any of a wide variety of electron beam or electromagnetic wavelengths, e.g., alpha, beta, gamma, X-rays and high energy electrons or non-ionizing radiation such as ultraviolet, visible, infrared, microwave or radio frequency.

The epoxidized copolymers of this invention may also be hydroxylated by methods old in the art as disclosed, for example, in U.S. Pat. No. 3,448,174, such as by treating it with an acidic agent such as hydroxy open the epoxy rings. The resulting hydroxylated copolymer may then be cured by agents such as diisocyanates, e.g., toluene diisocyanate, or a dianhydride such as pyromellitic anhydride. Alternatively, the hydroxylated copolymer may be maleated by treatment with maleic anhydride and the maleated copolymer cured with, for example, a diisocyanate, metal oxide or diamine.

In addition to the foregoing reactions the epoxy groups of the epoxidized copolymers of this invention are susceptible to a wide variety of additional reactions so that the polymer chain can be modified into a great number of functional groups. Typical examples of such reactions are listed in Volume I of Heterocyclic Compounds (edited by R. C. Elderfield), John Wiley & Sons, Inc., New York, 1950, Chapter 1.

The epoxidized block and random copolymers, including the star-branched polymers, of this invention in conjunction with cross-linking (curing) or subsequent reaction, can be used in a variety of applications, e.g., to produce electrical insulation, pressure sensitive adhesives, sealants, rubberized asphalts, in automotive applications, e.g., hoses, tubing, weatherstripping, in construction industry, e.g., to produce gaskets, rubber sheeting for roofing, pond and ditch liners, and in many other applications.

The following examples further illustrate the invention. However, it will be apparent to those skilled in the art that the specific reactants and reaction conditions used in the Examples do not limit the scope of the invention.

In all of the following examples, the experimental procedures used to prepare the polymer subsequently epoxidized were performed with dried reactors and equipment and under strictly anaerobic conditions. Extreme care must be used to exclude air, moisture and other impurities capable of interfering with the delicate chemical balance involved in the synthesis of the polymers subjected to epoxidation under this invention, as will be apparent to those skilled in the art.

EXAMPLE 1

This example illustrates the preparation and partial epoxidation of a triblock copolymer having two terminal polyisoprene blocks and a central polybutadiene block.

Two hundred milliliters (ml) of purified dried cyclohexane (99.5% available from Phillips Petroleum Co.) were introduced under nitrogen atmosphere into a two quart glass bowled stirred pressure reactor. The reactor was equipped with an air driven stirrer, a pressure gauge, a thermometer well, a heat exchange coil, a top surface inlet valve, a dip tube feeder with valve, a syringe injection port containing a viton rubber gasket and a blow-out disk (200 psi). Three milliliters (ml) of a 0.01M solution of dipyridyl indicator in cyclohexane and 6.5 ml (70 millimoles-mm) of freshly distilled tetrahydrofuran were injected into the reactor, whose contents were then heated to 54° C. The solution was titrated by slow addition of 0.1 molar butyl lithium (BuLi) until a red color was observed indicating the deactivation of all impurities. Next, 3.0 ml (2 g., 30 mm) of purified isoprene and 20 ml of 0.1 m BuLi solution were injected into the reactor. Oligomerization of the isoprene to form the initial block was completed in approximately one hour. To the solution of living polyisoprenyl anions was added an additional one liter of pre-titrated cyclohexane. To form the second block 100 grams of purified butadiene were slowly pressurized into the reactor at a rate to maintain a temperature below 60° C. After an hour, the reactor pressure had dropped to the initial value and the formation of the isoprene-butadiene block copolymer was complete. The diblock living anion was coupled to a triblock having twice the molecular weight of the diblock by the introduction of 11 ml of a 0.1M phenyl benzoate solution (in cyclohexane). The mixture, which contained a 10% stoichiometric excess of the coupling agent, was kept with stirring at 50° C. for an additional thirty minutes and then pressurized from the reactor. A portion of the unhydrogenated triblock polymer was isolated by flocculation in isopropanol containing an antioxidant Irganox 1076 to prevent the crosslinking of the highly unsaturated triblock. The solid polymer sample was filtered and dried in a vacuum oven for 18 hours. Infrared (FTIR) analysis showed the butadiene microstructure to have 50% 1,2- and 50% of 1,4-composition. Gel permeation chromotography of the sample, using differential refractive index and DAWN laser light-scattering dual detectors, determined the number average molecular weight (Mn) and weight average molecular weight (Mw) of the polymer to be 135,900 and 139,400, respectively, for a dispersity (Mw/Mn) of 1.08.

The foregoing triblock polymer is partially epoxidized primarily in the terminal polyisoprene blocks using the following procedure.

To a solution of 4.05 grams of such triblock polymer, in 100 ml of methylene chloride are added 1.44 grams of 70% metachloroperbenzoic acid dissolved in 80 ml methylene chloride. The mixture is stirred overnight at room temperature and then washed 4 times with a 5% aqueous solution of sodium bicarbonate. The organic layer is separated, dried by the addition of magnesium sulfate, filtered and concentrated by evaporation of the solvent to isolate the epoxidized polymer. Theoretically, each polymer molecule contains about 195 epoxide units primarily in the terminal polyisoprene blocks.

EXAMPLE 2

This example illustrates the selective hydrogenation of the central block and subsequent epoxidation of a high molecular weight triblock copolymer having two terminal polyisoprene blocks and a central polybutadiene block.

One hundred milliliter (ml) of cyclohexane containing 8 grams of dissolved triblock polymer as prepared in Example 1 was introduced into a PARR shaker hydrogenation apparatus. This amount of polymer represents 0.142 moles of polybutadiene unsaturation. The hydrogenation catalyst was prepared by adding 10.8 ml of a nickel octoate solution (6% by weight nickel) to a solution of 45.2 millimoles of triethyl aluminum in 102.2 ml of hexane. The nickel octoate was added slowly (over about 1 hour) using a syringe pump to give a final catalyst solution which was 0.1 molar in nickel and had an Al/Ni molar ratio of 3.6/1.0. The shaker apparatus was purged 4 times with hydrogen gas, sealed, heated and pressured to 50 psig with hydrogen. Temperature was maintained at 50° C. and the reaction vessel was shaken for four hours. Analysis of an aliquot of the product by FTIR demonstrated complete loss of absorption related to the 1,2-butadiene (910 and 994 cm$^{-1}$) and trans 1,4-butadiene (967 cm$^{-1}$), but retention of absorption related to 3,4-isoprene (vinylidene) structure (888 cm$^{-1}$). The reaction mixture was degassed and treated with 3–4 drops of Jeffamine D-2000 (a polyether diamine) and 1 ml of HCl (6N). After stirring for a short time, the dark catalyst color had discharged and the solution was added to 200 ml of isopropanol containing an antioxidant (0.5 g of Irganox 1076). The precipitated polymer was isolated and dried in a vacuum oven. Analysis of the polymer indicated essentially no residual nickel (less than 1 ppm).

The foregoing selectively hydrogenated triblock copolymer is epoxidized primarily on the terminal unsaturated polyisoprene blocks, using an epoxidation procedure similar to that of Example 1.

EXAMPLE 3

This example illustrates the preparation of an epoxidized triblock polymer wherein the terminal blocks consist of isoprene-styrene copolymers and the central block is polybutadiene. Incorporation of low levels of styrene into the end block is beneficial with certain end uses of the final epoxidized triblock copolymer.

520 grams of cyclohexane, 7.4 ml of tetrahydrofuran, 5 grams of isoprene and 5 grams of styrene were charged into a clear, dry one gallon autoclave kept under a 5 psig N$_2$ pressure. The contents were stirred (1500 rpm) and warmed to 55° C. Polymerization was initiated by the addition of 3.6 ml of a 1.6N solution of n-butyl lithium. The reaction was allowed to proceed for two hours (over 10 half times) at which time 1536 g of cyclohexane (pre-titrated with BuLi to a dipyridyl end point) were added to the reactor. Butadiene (400 ml) was pumped as a liquid into the reactor. Cooling water was employed as necessary to maintain 55° C. Polymerization of the butadiene was complete in one hour. The formed diblock was then coupled by the addition of 2.75 millimoles of phenyl benzoate as a 0.1 molar solution in cyclohexane. After 0.5 hour reaction time the final polymer was pressured from the reactor. Total solids measurement confirmed 100% monomer conversion. A small sample was isolated for analysis by precipitation in isopropanol. The vinyl (1,2-) content of the butadiene center block was shown to be 52% by FTIR. A GPC analysis using the Dawn detector showed:

$$M_n = 93,470$$
$$M_w = 96,210$$
$$\frac{M_w}{M_n} = 1.03$$

The magnitude of the molecular weight and narrowness of the molecular weight distribution confirm the success of the coupling reaction.

The foregoing block copolymer is partially epoxidized primarily in the terminal isoprene-styrene copolymer blocks using an epoxidation procedure similar to that of Example 1.

EXAMPLE 4

This example demonstrates the selective hydrogenation of the central blocks and subsequent epoxidation of the triblock polymer prepared substantially in the manner of Example 3, utilizing a hydrogenation catalyst prepared in a different manner than that described in Example 2.

A 400 ml pressure bottle containing a magnetic stir bar was capped with a rubber liner and two-holed bottle cap. To the bottle was added 160 ml of cyclohexane and 21.6 ml of nickel octoate solution (6% nickel) to give 22.5 millimoles of nickel as a 0.124 molar solution. One hole of the bottle cap was pierced with a 50 ml syringe, with syringe lock, containing 46.4 ml of 1.73 molar triethyl aluminum (80.27 millimoles). The other hole was pierced with a flexible needle cannula whose other end was submersed in mineral oil. While the contents of the bottle were stirred, the triethylaluminum solution was added as rapidly as possible without allowing the contents of the bottle to boil. The resultant homogenous dark solution was 0.1 molar in nickel and 0.36 molar in aluminum. This order of addition is the reverse of that reported by Falk and, in addition to being less time consuming, appears to give a catalyst with superior reproduceability and lifetime.

Into a one gallon autoclave was charged 155 grams of the triblock polymer prepared substantially in the manner of Example 3 as a 7.5 wt. percent solution in cyclohexane. This amount of polymer contained 2.75 moles of unsaturation from the polybutadiene segment. Ethoxy acetic acid (3.1 ml of 0.1M) was added and stirred at 1500 rpm for 0.5 hours to complete the complex with the Li cation. To this solution were added 70 ml of the catalyst solution prepared above. The reactor was sparged several times with hydrogen and then pressured to 70 pounds with hydrogen and warmed to 55° C. Several other catalyst additions, totalling 60 more ml, followed. After 4 hours, only the vinylidene (3,4-microstructure) unsaturation was observable by FTIR. After hydrogenation, the polymer solution was shortstopped and the polymer was isolated as described in Example 2. The polymer contained less than 1 ppm of residual nickel; its $M_n$ was 118,500, the $M_w$ was 129,000 and the $M_w/M_n=1.09$.

The $M_n$ of the starting polymer was 110,000, its $M_w$ was 112,900, with $M_w/M_n=1.03$.

Thermogravimetric analysis (TGA) of a sample of this hydrogenated polymer in nitrogen showed that only 10% of the polymer weight was lost at 435° C. and that TGA in oxygen resulted in a 10% weight loss at 360° C. (10 degree temperature rise per minute). The $T_g$ of the elastomer was –60° C.

The selectively hydrogenated polymer of this example is epoxidized primarily on the terminal ethylenically unsaturated isoprene-styrene copolymer blocks, using an epoxidation procedure similar to that of Example 1.

EXAMPLE 5

This example illustrates the preparation, selective hydrogenation, and epoxidation of triblock polymer essentially identical to that described in Examples 3 and 4, but synthesized via sequential polymerization.

The apparatus utilized was the same as that described in example 1. In this Example, which does not require a coupling step as earlier described, the three blocks of the polymer chain are polymerized sequentially to produce a polymer of 100,000 Mn directly. While catalyst usage is decreased in this method, the time necessary for completion of the polymerization reaction is greatly increased. It is not, therefore, the preferred technique for the production of symmetrical triblocks but does have the advantage of permitting the presence of two dissimilar end blocks, if desired.

To form the initial block, the procedures of Example 1 were followed, except that one gram of isoprene and one gram of styrene were polymerized using 1.0 millimoles of BuLi. After addition of the solvent as in Example 1, 96 grams of butadiene were added to the reactor and allowed to polymerize for one hour. One gram each of isoprene and styrene were added and the polymerization was allowed to proceed for 15 hours. This lengthy reaction time is necessary and reflects the low concentration of catalyst and monomer necessitated by the conditions in this block sequential polymerization.

Work up and hydrogenation of the polymer as in Examples 1–4 produced a selectively hydrogenated triblock having $M_n=104,200$ and $M_w=112,540$.

Using an epoxidation procedure similar to that of Example 1, the foregoing selectively hydrogenated triblock copolymer is epoxidized primarily on the terminal, ethylenically unsaturated isoprene-styrene copolymer blocks.

EXAMPLE 6

This example describes the preparation of a polymer similar to that of Example 3, but having considerably higher styrene content, such polymer being subsequently selectively hydrogenated and epoxidized.

To the apparatus described in Example 1 was charged 1100 ml of cyclohexane, 3 ml of 0.01 m dipyridyl, 6.5 ml of tetrahydrofuran (THF), 33 ml (30 g) of styrene and 3 ml (2 g) of isoprene.

The solution was warmed to 55° C. and titrated with BuLi, and after the end point, 20 ml of 0.1 molar BuLi were added. After 2 hours, 70.3 grams of purified butadiene were added. The butadiene was allowed to polymerize for an hour and 11 ml of a 0.1M phenyl benzoate solution were added to couple the diblock. The polymer work up and hydrogenation was as previously described. The polymeric product displayed unsaturation by FTIR corresponding to vinylidene (3,4-isoprene) double bonds only. The resultant material displayed thermoplastic elastomer properties similar to polymers made without the low level of isoprene used in this example.

The selectively hydrogenated polymer of this example is epoxidized primarily on the terminal, ethylenically unsaturated isoprene-styrene blocks using an epoxidation procedure similar to that of Example 1.

The polymer of this example is both a thermoplastic elastomer when uncured and a thermoset elastomer if cured. This invention thus provides the user with a choice of processing not available in heretofore existing commercial hydrocarbon elastomers and also provides an elastomer whose excellent physical properties provided by the styrene end blocks of current thermoplastic elastomers can be retained at greatly elevated temperatures (100°–150° C.).

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. An epoxidized solid block copolymer which prior to epoxidation comprises at least three alternating blocks

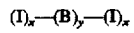

wherein I is a block of at least one polymerized conjugated diene having at least five (5) carbon atoms and the following formula

wherein $R^1$–$R^6$ are each hydrogen or a hydrocarbyl group, provided that at least one of $R^1$–$R^6$ is a hydrocarbyl group and provided that the structure of the residual double bond in the polymerized block I has the following formula

wherein $R'$, $R''$, $R_{III}$ and $R^{IV}$ are each hydrogen or a hydrocarbyl group, provided that either both $R'$ and $R''$ are hydrocarbyl groups or both $R'''$ and $R^{IV}$ are hydrocarbyl groups. B is a block of a polymer of at least one conjugated diene different from the polymerized diene of the block I, having at least four (4) carbon atoms and the following formula

wherein $R^7$–$R^{12}$ are each hydrogen or a hydrocarbyl group, provided that the structure of the residual double bond in the polymerized block B has the following formula

wherein $R^a$, $R^b$, $R^c$ and $R^d$ are each hydrogen (H) or a hydrocarbyl group, provided that one of $R^a$ or $R^b$ is hydrogen, one of $R^c$ or $R^d$ is hydrogen, and at least one of $R^a$, $R^b$, $R^c$ or $R^d$ is a hydrocarbyl group, x is 1 to 100, and y is 300 to 35,000.

2. The epoxidized copolymer of claim 1 which has been selectively hydrogenated, so that each of the blocks B is substantially completely hydrogenated and thereby contains substantially none of the original unsaturation, while each of the blocks I contains epoxy groups.

3. The epoxidized copolymer of claim 2 wherein said hydrogenation reaction is carried out before epoxidation.

4. The epoxidized copolymer of claim 3 wherein x is 2 to 100 and y 1,000 to 5,000.

5. The epoxidized copolymer of claim 4 wherein, after the hydrogenation reaction, and before epoxidation, the Iodine Number for the I blocks is about 10 to about 100% of the Iodine Number prior to the hydrogenation reaction.

6. The epoxidized copolymer of claim 5 wherein, after the hydrogenation reaction, and before epoxidation, the Iodine Number for the I blocks is about 25 to about 100% of the Iodine Number prior to the hydrogenation reaction.

7. The epoxidized copolymer of claim 6 wherein, after the hydrogenation reaction, and before epoxidation, the Iodine Number for the I blocks is about 50 to about 100% of the Iodine Number prior to the hydrogenation reaction.

8. The epoxidized copolymer of claim 7 wherein, after the hydrogenation reaction, and before epoxidation, the Iodine Number for the B blocks is about 0 to about 10% of the Iodine Number prior to the hydrogenation reaction.

9. The epoxidized copolymer of claim 8 wherein the diene of formula (1) is isoprene, 2,3-dimethyl-butadiene, 2-methyl-1,3-pentadiene, myrcene, 2-methyl-1,3-pentadiene, 3-methyl-1,3-pentadiene, 4-methyl-1,3-pentadiene, 2-phenyl-1,3-butadiene, 2-phenyl-1,3-pentadiene, 3-phenyl-1,3-pentadiene, 2,3-dimethyl-1,3-pentadiene, 4-methyl-1,3-pentadiene, 2-hexyl-1,3-butadiene, 3-methyl-1,3-hexadiene, 2-benzyl-1,3-butadiene, 2-p-tolyl-1,3-butadiene or mixtures thereof.

10. The epoxidized copolymer of claim 9 wherein the diene of formula (1) is isoprene, myrcene or 2-methyl-1,3-pentadiene.

11. The epoxidized copolymer of claim 10 wherein the diene of formula (1) is isoprene.

12. The epoxidized copolymer of claim 11 wherein the diene of formula (3) is 1,3-butadiene, 1,3-pentadiene, 2,4-hexadiene, 1,3-hexadiene, 1,3-heptadiene, 2,4-heptadiene, 1,3-octadiene, 2,4-octadiene, 3,5-octadiene, 1,3-nonadiene, 2,4-nonadiene, 3,5-nonadiene, 1,3-decadiene, 2,4-decadiene, 3,5-decadiene or mixtures thereof.

13. The epoxidized copolymer of claim 12 wherein the diene of formula (3) is 1,3-butadiene, 1,3-pentadiene, 2,4-hexadiene or 1,3 hexadiene.

14. The epoxidized copolymer of claim 13 wherein the conjugated diene of formula (3) is 1,3-butadiene.

15. The epoxidized copolymer of claim 14 wherein each of the B blocks, prior to the selective hydrogenation reaction, has a microstructure of 1,4- and 1,2-units.

16. The epoxidized copolymer of claim 15 wherein each of the B blocks, prior to the selective hydrogenation reaction, has at least about 25% wt. of the 1,2-units.

17. The epoxidized copolymer of claim 16 wherein each of the B blocks, prior to the selective hydrogenation reaction, has about 30 to about 90% wt. of the 1,2-units.

18. The epoxidized copolymer of claim 17 wherein each of the B blocks, prior to the selective hydrogenation reaction, has about 45 to about 65% wt. of the 1,2-units.

19. An epoxidized solid block copolymer which prior to epoxidation comprises at least three alternating blocks

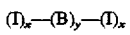

wherein I is a block of at least one polymerized conjugated diene having at least five (5) carbon atoms and the following formula

wherein $R^1$–$R^6$ are each hydrogen or a hydrocarbyl group, provided that at least one of $R^1$–$R^6$ is a hydrocarbyl group and provided that the structure of the residual double bond in the polymerized block I has the following formula

wherein $R^I$, $R^{II}$, $R^{III}$ and $R^{IV}$ are each hydrogen or a hydrocarbyl group, provided that either both $R^I$ and $R^{II}$ are hydrocarbyl groups or both $R^{III}$ and $R^{IV}$ are hydrocarbyl groups, B is a block of a polymer of a conjugated diene, other than 1,3-butadiene, different from the polymerized diene of the block I, having at least five (5) carbon atoms and the following formula

wherein $R^7$–$R^{12}$ are each hydrogen or a hydrocarbyl group, provided that the structure of the residual double bond in the polymerized block B has the following formula

wherein $R^a$, $R^b$, $R^c$ and $R^d$ are each hydrogen (H) or a hydrocarbyl group, provided that one of $R^a$ or $R^b$ is hydrogen, one of $R^c$ or $R^d$ is hydrogen, and at least one of $R^a$, $R^b$, $R^c$ or $R^d$ is a hydrocarbyl group, x is 1 to 100, and y is 300 to 35,000.

20. An epoxidized solid block copolymer which prior to epoxidation comprises at least three alternating blocks

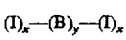

wherein I is a block of at least one polymerized conjugated diene having at least five (5) carbon atoms and the following formula $$R^1-C=C-C=C-R^6 \quad (1)$$
$$\phantom{R^1-}|\phantom{=}|\phantom{-}|\phantom{=}|$$
$$\phantom{R^1-C}R^2\phantom{=}R^3\phantom{-}R^4\phantom{=}R^5$$

wherein $R^1$–$R^6$ are each hydrogen or a hydrocarbyl group, provided that at least one of $R^1$–$R^6$ is a hydrocarbyl group and provided that the structure of the residual double bond in the polymerized block I has the following formula $$\begin{array}{c} R^{II} \\ | \\ R^{I}-C=C-R^{III} \\ | \\ R^{IV} \end{array} \quad (2)$$

wherein $R^I$, $R^{II}$, $R^{III}$ and $R^{IV}$ are each hydrogen or a hydrocarbyl group, provided that either both $R^I$ and $R^{II}$ are hydrocarbyl groups or both $R^{III}$ and $R^{IV}$ are hydrocarbyl groups, B is a block of a polymer of at least one conjugated diene different from the polymerized diene of the block I, having at least four (4) carbon atoms and the following formula $$R^7-C=C-C=C-R^{12} \quad (3)$$
$$\phantom{R^7-}|\phantom{=}|\phantom{-}|\phantom{=}|$$
$$\phantom{R^7-C}R^8\phantom{=}R^9\phantom{-}R^{10}\phantom{=}R^{11}$$

wherein $R^7$–$R^{12}$ are each hydrogen or hydrocarbyl group, provided that the structure of the residual double bond in the polymerized block B has the following formula $$\begin{array}{c} R^b \\ | \\ R^a-C=C-R^c \\ | \\ R^d \end{array} \quad (4)$$

wherein $R^a$, $R^b$, $R^c$ and $R^d$ are each hydrogen (H) or a hydrocarbyl group, provided that one of $R^a$ or $R^b$ is hydrogen, one of $R^c$ or $R^d$ is hydrogen, and at least one of $R^a$, $R^b$, $R^c$ or $R^d$ is a hydrocarbyl group, x is 1 to 100, and y is 300 to 35,000, the conjugated diene of formula (3) being predominantly 1,3-butadiene which, after polymerization, has at least about 25% wt. of the 1,2-units.

21. The epoxidized copolymer of claim 20 wherein each of the blocks B has about 30 to about 90% wt of the 1,2-units.

22. The epoxidized copolymer of claim 21 wherein each of the blocks B has about 45 to about 65% wt of the 1,2-units.

23. A method of forming an epoxidized solid block copolymer which prior to epoxidation comprises at least three alternating blocks $$(I)_x-(B)_y-(I)_x$$

wherein I is a block of at least one polymerized conjugated diene having at least five (5) carbon atoms and the following formula $$R^1-C=C-C=C-R^6 \quad (1)$$
$$\phantom{R^1-}|\phantom{=}|\phantom{-}|\phantom{=}|$$
$$\phantom{R^1-C}R^2\phantom{=}R^3\phantom{-}R^4\phantom{=}R^5$$

wherein $R^1$–$R^6$ are each hydrogen or a hydrocarbyl group, provided that at least one of $R^1$–$R^6$ is a hydrocarbyl group and provided that the structure of the residual double bond in the polymerized block I has the following formula $$\begin{array}{c} R^{II} \\ | \\ R^{I}-C=C-R^{III} \\ | \\ R^{IV} \end{array} \quad (2)$$

wherein $R^I$, $R^{II}$, $R^{III}$ and $R^{IV}$ are each hydrogen or a hydrocarbyl group, provided that either both $R^I$ and $R^{II}$ are hydrocarbyl groups or both $R^{III}$ and $R^{IV}$ are hydrocarbyl groups, B is a block of a polymer of at least one conjugated diene, different from that used to polymerize the block I, having at least four (4) carbon atoms and the following formula $$R^7-C=C-C=C-R^{12} \quad (3)$$
$$\phantom{R^7-}|\phantom{=}|\phantom{-}|\phantom{=}|$$
$$\phantom{R^7-C}R^8\phantom{=}R^9\phantom{-}R^{10}\phantom{=}R^{11}$$

wherein $R^7$–$R^{12}$ are each hydrogen or a hydrocarbyl group, provided that the structure of the residual double bond in the polymerized block B has the following formula $$\begin{array}{c} R^b \\ | \\ R^a-C=C-R^c \\ | \\ R^d \end{array} \quad (4)$$

wherein $R^a$, $R^b$, $R^c$ and $R^d$ are each hydrogen (H) or a hydrocarbyl group, provided that one of $R^a$ or $R^b$ is hydrogen, one of $R^c$ or $R^d$ is hydrogen, and at least one of $R^a$, $R^b$, $R^c$ or $R^d$ is a hydrocarbyl group, x is 1 to 100, and y is 300 to 35,000, said method comprising polymerizing under anionic polymerization conditions the conjugated diene of formula (1) until it forms the block I, adding to the reaction mixture the conjugated diene of formula (3) and polymerizing it to the block B, subsequently adding to the reaction mixture the conjugated diene of formula (1) to form the block I, and subsequently selectively hydrogenating and epoxidizing the resulting block copolymer so that each of the blocks B is substantially completely hydrogenated, while each of the blocks I contains epoxy groups.

24. A method of forming an epoxidized solid block copolymer which prior to epoxidation comprises at least three alternating blocks $$(I)_x-(B)_y-(I)_x$$

wherein I is a block of at least one polymerized conjugated diene having at least five (5) carbon atoms and the following formula $$R^1-C=C-C=C-R^6 \quad (1)$$
$$\phantom{R^1-}|\phantom{=}|\phantom{-}|\phantom{=}|$$
$$\phantom{R^1-C}R^2\phantom{=}R^3\phantom{-}R^4\phantom{=}R^5$$

wherein $R^1$–$R^6$ are each hydrogen or a hydrocarbyl group, provided that at least one of $R^1$–$R^6$ is a hydrocarbyl group and provided that the structure of the residual double bond in the polymerized block I has the following formula $$\begin{array}{c} R^{II} \\ | \\ R^{I}-C=C-R^{III} \\ | \\ R^{IV} \end{array} \quad (2)$$

wherein $R^I$, $R^{II}$, $R^{III}$ and $R^{IV}$ are each hydrogen or a hydrocarbyl group, provided that either both $R^I$ and $R^{II}$ are hydrocarbyl groups or both $R^{III}$ and $R^{IV}$ are hydrocarbyl groups, B is a block of a polymer of at least one conjugated diene, different from that used to polymerize the block I, having at least four (4) carbon atoms and the following formula

wherein $R^7$-$R^{12}$ are each hydrogen or a hydrocarbyl group, provided that the structure of the residual double bond in the polymerized block B has the following formula

wherein $R^a$, $R^b$, $R^c$ and $R^d$ are each hydrogen (H) or a hydrocarbyl group, provided that one of $R_a$ or $R_b$ is hydrogen, one of $R_c$ or $R_d$ is hydrogen, and at least one of $R^a$, $R^b$, $R^c$ or $R^d$ is a hydrocarbyl group, x is 1 to 100 and y is 300 to 35,000, said method comprising polymerizing under anionic polymerization conditions the conjugated diene of formula (1), to form the first block I, separately polymerizing under anionic polymerization conditions the conjugated diene of formula (1) to form the second block I, adding to the reaction mixture containing the second block I the conjugated diene of formula (3) and polymerizing it to the block B, thereby forming a diblock I—B, subsequently coupling the first block I to the diblock I—B in the presence of a coupling agent to produce the block copolymer, and subsequently selectively hydrogenating and epoxidizing the copolymer, so that each of the blocks B is substantially completely hydrogenated, while each of the blocks I contains epoxy groups.

25. The method of claim 24 wherein the coupling agent is selected from the group consisting of esters, $CO_2$, iodine, dihaloalkanes, silicon tetrachloride, alkyltrichlorosilanes, dialkyl dichloro silanes, and divinyl benzene.

* * * * *

UNITED STATES PATENT AND TRADEMARK OFFICE
CERTIFICATE OF CORRECTION

PATENT NO. : 5,747,598

DATED : May 5, 1998

INVENTOR(S) : Thomas S. Coolbaugh et al.

It is certified that error appears in the above-identified patent and that said Letters Patent is hereby corrected as shown below:

In the Claims:

Column 32, line 61, "$R_{III}$" should be ---$R^{III}$---;

Column 33, line 13, "$^{rd}$" should be ---$R^d$---;

Column 37, line 14, "$R_a$ or $R_b$" should be ---$R^a$ or $R^b$---; and

Column 37, line 15, "$R_c$ or $R_d$" should be ---$R^c$ or $R^d$---.

Signed and Sealed this

Twenty-ninth Day of December, 1998

Attest:

BRUCE LEHMAN

Attesting Officer

Commissioner of Patents and Trademarks